US009246837B2

(12) United States Patent
Dixon et al.

(10) Patent No.: US 9,246,837 B2
(45) Date of Patent: *Jan. 26, 2016

(54) SYSTEM AND METHOD FOR MANAGING OUT OF ORDER PACKETS IN A NETWORK ENVIRONMENT

(71) Applicant: CISCO TECHNOLOGY, INC., San Jose, CA (US)

(72) Inventors: Walter Dixon, Fuquay Varina, NC (US); Mahesh C. Kalyanakrishnan, Cary, NC (US); Humberto M. Tavares, Cary, NC (US); Showen Yeh, Cary, NC (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/260,387

(22) Filed: Apr. 24, 2014

(65) Prior Publication Data

US 2014/0233574 A1 Aug. 21, 2014

Related U.S. Application Data

(63) Continuation of application No. 12/642,790, filed on Dec. 19, 2009.

(51) Int. Cl.
*H04L 12/863* (2013.01)
*H04L 12/721* (2013.01)
*H04L 12/801* (2013.01)

(52) U.S. Cl.
CPC .............. *H04L 47/624* (2013.01); *H04L 45/38* (2013.01); *H04L 47/34* (2013.01)

(58) Field of Classification Search
CPC ....... G06F 11/00; G06F 15/16; G06F 15/167; G06F 15/173; H04L 12/28; H04L 12/56; H04L 12/721; H04L 12/863; H04L 45/38; H04L 47/624
See application file for complete search history.

(56) References Cited

U.S. PATENT DOCUMENTS 5,151,899 A  9/1992  Thomas et al.
5,371,731 A  12/1994  Pratt et al.
(Continued)

FOREIGN PATENT DOCUMENTS

EP  1250022  10/2002
EP  1619917  1/2006
(Continued)

OTHER PUBLICATIONS

"3rd Generation Partnership Project; Technical Specification Group Core Network and Terminals; Policy and Charging Control over Gx reference point (Release 9)," 3GPP Standard; 3GPP TS 29.212, $3^{rd}$ Generational Partnership Project (3GPP), Mobile Competence Centre; 650, Route Des Lucioles; F-06921 Sophia-Antipolis Cedex; France, No. V9.0.0, Sep. 1, 2009; 92 pages.

(Continued)

*Primary Examiner* — Jung Park
*Assistant Examiner* — Leon Andrews
(74) *Attorney, Agent, or Firm* — Patent Capital Group

(57) ABSTRACT

A method is provided in one example embodiment and includes creating at a network element an entry designating an out of order ("OOO") sequence number range associated with a flow and receiving at the network element a packet associated with the flow, wherein the packet corresponds to a first sequence number range, wherein the first sequence number range falls within the OOO sequence number range designated in the entry. The method may further include updating the entry to remove sequence numbers comprising the first sequence number range from the OOO sequence number range and forwarding the packet without awaiting receipt of any other packets associated with the flow.

20 Claims, 14 Drawing Sheets

(56) References Cited

U.S. PATENT DOCUMENTS

| | | | |
|---|---|---|---|
| 5,898,713 A | 4/1999 | Melzer et al. | |
| 6,496,516 B1 | 12/2002 | Dabecki et al. | |
| 6,522,880 B1 | 2/2003 | Verma et al. | |
| 6,643,621 B1 | 11/2003 | Dodrill et al. | |
| 6,654,792 B1 | 11/2003 | Verma et al. | |
| 6,684,256 B1 | 1/2004 | Warrier et al. | |
| 6,728,266 B1 | 4/2004 | Sabry et al. | |
| 6,829,242 B2 | 12/2004 | Davison et al. | |
| 6,839,767 B1 | 1/2005 | Davies et al. | |
| 6,862,624 B2 | 3/2005 | Colby et al. | |
| 6,917,592 B1 | 7/2005 | Ramankutty et al. | |
| 6,922,411 B1 | 7/2005 | Taylor | |
| 6,968,389 B1 | 11/2005 | Menditto et al. | |
| 7,317,693 B1 | 1/2008 | Roesch et al. | |
| 7,366,189 B2 | 4/2008 | Davison et al. | |
| 7,426,202 B2 | 9/2008 | Warrier et al. | |
| 7,447,765 B2 | 11/2008 | Aerrabotu et al. | |
| 7,496,662 B1 * | 2/2009 | Roesch et al. | 709/224 |
| 7,502,836 B1 | 3/2009 | Menditto et al. | |
| 7,522,521 B2 | 4/2009 | Bettink et al. | |
| 7,610,330 B1 | 10/2009 | Quinn et al. | |
| 7,673,072 B2 | 3/2010 | Boucher et al. | |
| 7,742,399 B2 | 6/2010 | Pun | |
| 7,768,983 B2 | 8/2010 | Nylander et al. | |
| 7,792,113 B1 | 9/2010 | Foschiano et al. | |
| 7,808,919 B2 | 10/2010 | Nadeau et al. | |
| 7,827,256 B2 | 11/2010 | Phillips et al. | |
| 7,856,512 B2 | 12/2010 | Hilla et al. | |
| 7,885,248 B2 | 2/2011 | Harper et al. | |
| 7,885,260 B2 | 2/2011 | Paul et al. | |
| 7,890,636 B2 | 2/2011 | Grayson et al. | |
| 7,925,709 B1 | 4/2011 | Ben-Yoseph et al. | |
| 7,926,071 B2 | 4/2011 | Stephens et al. | |
| 7,929,442 B2 | 4/2011 | Connor et al. | |
| 7,990,993 B1 | 8/2011 | Ghosh et al. | |
| 8,018,866 B1 | 9/2011 | Kasturi et al. | |
| 8,086,253 B1 | 12/2011 | Kalmkar et al. | |
| 8,279,776 B1 | 10/2012 | Everson et al. | |
| 8,339,959 B1 | 12/2012 | Moisand et al. | |
| 9,003,057 B2 | 4/2015 | Mahaffey et al. | |
| 9,009,293 B2 | 4/2015 | Batz et al. | |
| 9,014,158 B2 | 4/2015 | Andreasen et al. | |
| 9,015,318 B1 | 4/2015 | Batz et al. | |
| 9,030,991 B2 | 5/2015 | Andreasen et al. | |
| 9,031,038 B2 | 5/2015 | Andreasen et al. | |
| 9,049,046 B2 | 6/2015 | Andreasen et al. | |
| 2002/0046264 A1 | 4/2002 | Dillon et al. | |
| 2002/0053029 A1 | 5/2002 | Nakamura et al. | |
| 2003/0028433 A1 | 2/2003 | Merriman et al. | |
| 2003/0028644 A1 | 2/2003 | Maguire et al. | |
| 2003/0039237 A1 | 2/2003 | Forslow | |
| 2003/0058872 A1 | 3/2003 | Berggreen et al. | |
| 2003/0097481 A1 | 5/2003 | Richter | |
| 2004/0054925 A1 | 3/2004 | Etheridge et al. | |
| 2004/0088385 A1 | 5/2004 | Blanchet et al. | |
| 2004/0224678 A1 | 11/2004 | Dahod et al. | |
| 2004/0236855 A1 | 11/2004 | Peles | |
| 2005/0013253 A1 | 1/2005 | Lindskog et al. | |
| 2005/0025152 A1 * | 2/2005 | Georgiou et al. | 370/394 |
| 2005/0058153 A1 | 3/2005 | Santhoff et al. | |
| 2005/0074005 A1 | 4/2005 | Okuno | |
| 2005/0088974 A1 | 4/2005 | Savoor et al. | |
| 2005/0091371 A1 | 4/2005 | Delegue et al. | |
| 2005/0096016 A1 | 5/2005 | Tervo et al. | |
| 2005/0120091 A1 | 6/2005 | Casais et al. | |
| 2005/0147069 A1 | 7/2005 | Rink et al. | |
| 2005/0239473 A1 | 10/2005 | Pan et al. | |
| 2005/0246346 A1 | 11/2005 | Gerdes et al. | |
| 2005/0286504 A1 | 12/2005 | Kwon | |
| 2006/0018328 A1 | 1/2006 | Mody et al. | |
| 2006/0029084 A1 | 2/2006 | Grayson | |
| 2006/0058021 A1 | 3/2006 | Fox et al. | |
| 2006/0098573 A1 | 5/2006 | Beer et al. | |
| 2006/0164992 A1 | 7/2006 | Brown et al. | |
| 2006/0222086 A1 | 10/2006 | Frye | |
| 2006/0224750 A1 | 10/2006 | Davies et al. | |
| 2006/0234678 A1 | 10/2006 | Juitt et al. | |
| 2006/0256722 A1 | 11/2006 | Taha et al. | |
| 2006/0268901 A1 | 11/2006 | Choyi et al. | |
| 2006/0291388 A1 | 12/2006 | Amdahl et al. | |
| 2007/0014245 A1 | 1/2007 | Aloni et al. | |
| 2007/0027992 A1 | 2/2007 | Judge et al. | |
| 2007/0067839 A1 | 3/2007 | Hamada et al. | |
| 2007/0078955 A1 | 4/2007 | Siliquini et al. | |
| 2007/0097983 A1 | 5/2007 | Nylander et al. | |
| 2007/0101421 A1 | 5/2007 | Wesinger et al. | |
| 2007/0105568 A1 | 5/2007 | Nylander et al. | |
| 2007/0116019 A1 | 5/2007 | Cheever et al. | |
| 2007/0116020 A1 | 5/2007 | Cheever et al. | |
| 2007/0201369 A1 | 8/2007 | Pedersen et al. | |
| 2007/0201383 A1 | 8/2007 | Ong et al. | |
| 2007/0208820 A1 * | 9/2007 | Makhervaks et al. | 709/212 |
| 2007/0243872 A1 | 10/2007 | Gallagher et al. | |
| 2007/0253328 A1 | 11/2007 | Harper et al. | |
| 2007/0271453 A1 | 11/2007 | Pohja et al. | |
| 2007/0298848 A1 | 12/2007 | Babin | |
| 2008/0010354 A1 | 1/2008 | Sasaki et al. | |
| 2008/0025261 A1 | 1/2008 | Riley | |
| 2008/0026740 A1 | 1/2008 | Netanel | |
| 2008/0045267 A1 | 2/2008 | Hind et al. | |
| 2008/0114862 A1 | 5/2008 | Moghaddam et al. | |
| 2008/0133518 A1 | 6/2008 | Kapoor et al. | |
| 2008/0137541 A1 | 6/2008 | Agarwal et al. | |
| 2008/0147837 A1 | 6/2008 | Klein et al. | |
| 2008/0162637 A1 | 7/2008 | Adamczyk et al. | |
| 2008/0176582 A1 | 7/2008 | Ghai et al. | |
| 2008/0177880 A1 | 7/2008 | Ginis | |
| 2008/0188223 A1 | 8/2008 | Vesterinen et al. | |
| 2008/0298309 A1 | 12/2008 | Dahod et al. | |
| 2008/0301254 A1 * | 12/2008 | Bestler | 709/212 |
| 2008/0310404 A1 | 12/2008 | Valme et al. | |
| 2008/0316980 A1 | 12/2008 | Ahlen et al. | |
| 2009/0017864 A1 | 1/2009 | Keevill et al. | |
| 2009/0061821 A1 | 3/2009 | Chen et al. | |
| 2009/0061873 A1 | 3/2009 | Bao et al. | |
| 2009/0067417 A1 | 3/2009 | Kalavade et al. | |
| 2009/0086742 A1 | 4/2009 | Ghai et al. | |
| 2009/0089447 A1 | 4/2009 | Balachandran et al. | |
| 2009/0092136 A1 | 4/2009 | Nazareth et al. | |
| 2009/0098872 A1 | 4/2009 | Deshpande et al. | |
| 2009/0109849 A1 | 4/2009 | Wood et al. | |
| 2009/0109982 A1 * | 4/2009 | Batz et al. | 370/401 |
| 2009/0129271 A1 | 5/2009 | Ramankutty et al. | |
| 2009/0156213 A1 | 6/2009 | Spinelli et al. | |
| 2009/0161680 A1 | 6/2009 | Ishikawa et al. | |
| 2009/0164597 A1 | 6/2009 | Shuster | |
| 2009/0207759 A1 | 8/2009 | Andreasen et al. | |
| 2009/0215438 A1 | 8/2009 | Mittal et al. | |
| 2009/0254658 A1 | 10/2009 | Kamikura et al. | |
| 2009/0262682 A1 | 10/2009 | Khetawat et al. | |
| 2009/0268739 A1 | 10/2009 | Dunbar et al. | |
| 2009/0279522 A1 | 11/2009 | Leroy et al. | |
| 2009/0286510 A1 | 11/2009 | Huber et al. | |
| 2009/0307746 A1 | 12/2009 | Di et al. | |
| 2010/0010991 A1 | 1/2010 | Joshi | |
| 2010/0067462 A1 | 3/2010 | Beser et al. | |
| 2010/0077102 A1 | 3/2010 | Lim et al. | |
| 2010/0082787 A1 | 4/2010 | Kommula et al. | |
| 2010/0091653 A1 | 4/2010 | Koodli et al. | |
| 2010/0091775 A1 | 4/2010 | Yamamoto | |
| 2010/0103871 A1 | 4/2010 | Mooney et al. | |
| 2010/0124933 A1 | 5/2010 | Chowdhury et al. | |
| 2010/0131646 A1 | 5/2010 | Drako | |
| 2010/0174829 A1 | 7/2010 | Drako | |
| 2010/0186064 A1 | 7/2010 | Huang et al. | |
| 2010/0195640 A1 | 8/2010 | Park et al. | |
| 2010/0278070 A1 | 11/2010 | Melia et al. | |
| 2010/0291897 A1 | 11/2010 | Ghai et al. | |
| 2011/0021192 A1 | 1/2011 | Grayson et al. | |
| 2011/0021196 A1 | 1/2011 | Grayson et al. | |
| 2011/0058479 A1 | 3/2011 | Chowdhury et al. | |
| 2011/0063976 A1 | 3/2011 | Birk et al. | |
| 2011/0069663 A1 | 3/2011 | Shu et al. | |
| 2011/0075557 A1 | 3/2011 | Chowdhury et al. | |

(56) References Cited

U.S. PATENT DOCUMENTS

| | | | |
|---|---|---|---|
| 2011/0075675 A1 | 3/2011 | Koodli et al. |
| 2011/0076985 A1 | 3/2011 | Chami et al. |
| 2011/0116377 A1 | 5/2011 | Batz et al. |
| 2011/0122870 A1 | 5/2011 | Dixon et al. |
| 2011/0145103 A1 | 6/2011 | Ljunggren et al. |
| 2011/0145111 A1 | 6/2011 | Ljundren et al. |
| 2011/0182249 A1 | 7/2011 | Yang et al. |
| 2011/0185049 A1 | 7/2011 | Atreya et al. |
| 2011/0225284 A1 | 9/2011 | Savolainen |
| 2011/0235546 A1 | 9/2011 | Horn et al. |
| 2011/0235595 A1 | 9/2011 | Mehta et al. |
| 2011/0295942 A1 | 12/2011 | Raghunath et al. |
| 2012/0002543 A1 | 1/2012 | Dighe et al. |
| 2012/0076120 A1 | 3/2012 | Kovvali et al. |
| 2012/0082073 A1 | 4/2012 | Andreasen et al. |
| 2012/0082093 A1 | 4/2012 | Andreasen et al. |
| 2012/0082094 A1 | 4/2012 | Andreasen et al. |
| 2012/0082132 A1 | 4/2012 | Andreasen et al. |
| 2012/0082146 A1 | 4/2012 | Andreasen et al. |
| 2012/0082161 A1 | 4/2012 | Leung et al. |
| 2012/0184258 A1 | 7/2012 | Kovvali et al. |
| 2012/0224536 A1 | 9/2012 | Hahn et al. |
| 2013/0003741 A1 | 1/2013 | Singh et al. |
| 2013/0041934 A1 | 2/2013 | Annamalaisami et al. |
| 2013/0058274 A1 | 3/2013 | Scherzer et al. |
| 2013/0258963 A1 | 10/2013 | Mihaly et al. |
| 2014/0226474 A1 | 8/2014 | Janarthanan |
| 2014/0226521 A1 | 8/2014 | Jilani |
| 2015/0146719 A1 | 5/2015 | Janarthanan et al. |
| 2015/0172119 A1 | 6/2015 | Mahaffey |
| 2015/0188828 A1 | 7/2015 | Batz et al. |
| 2015/0195245 A1 | 7/2015 | Batz et al. |
| 2015/0215810 A1 | 7/2015 | Andreasen et al. |

FOREIGN PATENT DOCUMENTS

| | | |
|---|---|---|
| EP | 1978685 | 10/2008 |
| WO | WO 92/07438 | 4/1992 |
| WO | WO 92/14327 | 8/1992 |
| WO | WO2005/015825 | 2/2005 |
| WO | WO2009/089455 | 7/2009 |
| WO | WO2009/132700 | 11/2009 |
| WO | WO2011/062745 | 5/2011 |
| WO | WO2011/062746 | 5/2011 |

OTHER PUBLICATIONS

3GPP TS.23.203 v.11.3.0 Technical Specification—"3rd Generation Partnership Project; Technical Specification Group Services and System Aspects; Policy and Charging control architecture (Release 11)," Sep. 2011; 167 pages.

3GPP TS.23.401 v.10.5.0 Technical Specification—"3rd Generation Partnership Project; Technical Specification Group Services and System Aspects: General Packet Radio Service (GPRS) enhancements for Evolved Universal Terrestrial Radio Access Network (E-UTRAN) access (Release 10)," Sep. 2011, 284 pages.

3GPP TS 23.236 v.10.0.0 Technical Specification—"3rd General Partnership Project; Technical Specification Group Services and Systems Aspects; Intra-Domain Connection of Radio Access Network (RAN) Nodes to Multiple Cor Network (CN) Nodes (Release 10)," Mar. 2010, 39 pages.

Chowdhury, K. "Fast Handoff Support for HRPD," 3rd Generation Partnership Project 2, 3GPP2, Apr. 24, 2006.

Chowdhury, K. "Network-Based Layer 3 Connectivity and Mobility Management for IPv6," draft-chowdbury-netmip6-01.txt, Network Working Group Internet Draft, Sep. 8, 2006, 20 pages http://tools.ietf.org/html/draft-chowdbury-netmip6-01.

Chowdhury, K., "Network Based L3 Connectivity and Mobility Management for IPv4," draft-chowdbury-netmip4-001.tt, Feb. 25, 2006: 16 pages http://tools.ietf.org/html/draft-chowdbury-netmip4-00.

Cisco Systems, Inc., "Cisco Application-Oriented Networking," © 1992-2006; 10 pages http://www.cisco.com/en/US/prod/collateral/modules/ps6438/product_data_sheet0900aecd802c1f9c.html.

Cisco Systems, Inc., "Cisco NAC Appliance—Clean Access Manager Installation and Configuration Guide," Jul. 2009, 5 pages http://www.cisco.com/en/US/docs/securty/nac/appliance/configuration_guide/461/cam/cam461ug.pdf.

Cisco Systems, Inc., "Cisco NAC Appliance—Clean Access Server Installation and Configuration Guide, Rel. 4.6 (1)," Jul. 2009, 3 pages: http://www.cisco.com/en/US/docs/security/nac/appliance/configuration_guide/461/cas/cas461ug.pdf.

U.S. Appl. No. 12/642,790, filed Dec. 19, 2009, entitled "System and Method for Managing Out of Order Packets in a Network Environment," Inventor(s): Walter Dixon et al.

U.S. Appl. No. 12/621,114, filed Nov. 18, 2009, entitled "System and Method for Inspecting Domain Name System Flows in a Network Environment," Inventor(s): Robert Batz et al.

U.S. Appl. No. 12/642,791, filed Dec. 19, 2009, entitled "System and Method for Providing Subscriber Aware Routing in a Network Environment," Inventor(s): Shmuel Shaffer.

U.S. Appl. No. 12/984,034, filed Jan. 4, 2011, entitled "System and Method for Exchanging Information in a Mobile Wireless Network Environment," Inventor(s): Gary B. Mahaffey, et al.

U.S. Appl. No. 13/159,906, filed Jun. 14, 2011, entitled "Selective Packet Sequence Acceleration in a Network Environment," Inventor(s): Bhagatram Janarthanan et al.

U.S. Appl. No. 13/160,189, filed Jun. 14, 2011, entitled "Preserving Sequencing During Selective Packet Acceleration in a Network Environment," Inventor(s): Bhagatram Janarthanan et al.

U.S. Appl. No. 13/160,344, filed Jun. 14, 2011, entitled "Accelerated Processing of Aggregate Data Flows in a Network Environment," Inventor(s): Imnaz Meher Jilani et al.

U.S. Appl. No. 14/257,098, filed Apr. 21, 2014, entitled "Accelerated Processing of Aggregate Data Flows in a Network Environment," Inventor(s): Imnaz Meher Jilani et al.

U.S. Appl. No. 13/160,426, filed Jun. 14, 2011, entitled "Selective Packet Sequence Acceleration in a Network Environment," Inventor(s): Bhagatram Janarthanan.

U.S. Appl. No. 14/257,131, filed Apr. 21, 2014, entitled "Selective Packet Sequence Acceleration in a Network Environment," Inventor(s): Bhagatram Janarthanan.

Cisco Systems, Inc., Configuration URL Routing (L5 Routing) on the CSS 11000 and 11500, © 1992-2006; Document ID: 25999; 5 pages http://www.cisco.com/en/US/products/hw/contnetw/ps792/products_configuration_example09186a00801c0dbc.shtml.

Devarapalli, V., et al., "Proxy Mobile IPv6 and Mobil IPv6 Interworking," draft-devarapalli-netlmm-pmipv6-mipv6-00.txt, NETLMM Working Group Internet Draft, Apr. 10, 2007; 9 pages http://tools.ietf.org/html/draft-devarapalli-netlmm-pmipv6-mipv6-00.

Lior, A., et al., "Mobile IP Key Derivation using EAP," draft-lior-mipkeys-eap-00, Network Working Group, Feb. 25, 2006; 17 pages http://tools.ietf.org/html/draft-lior-mipkeys-eap-00.

Navali, J., et al., "IPv6 over Network based Mobile IPv4," draft-navali-ip6-over-netmip4-00.txt, Network Working Group, Feb. 25, 2006; 20 pages http://tools.ietf.html/draft-navali-ip6-over-netmip4-00.

PCT Mar. 1, 2011 Notification of Transmittal (1 page) of the International Search Report (4 pages) and the Written Opinion of the International Searching Authority, or the Declaration (6 pages) for PCT/US2010/054834.

PCT May 31, 2012 International Preliminary Report on Patentability and Written Opinion of the International Searching Authority (8 pages) for PCT/US2010/054834.

PCT Feb. 8, 2011 Notification of Transmittal (1 page) of the International Search Report (4 pages) and the Written Opinion of the International Searching Authority, or the Declaration (7 pages) for PCT/US2010/054838.

PCT May 30, 2012 International Preliminary Report on Patentability and Written Opinion of the International Searching Authority (8 pages) for PCT/US2010/054838.

"3GPP TS 23.203 V9.2.0 (Sep. 2009) Technical Specification $3^{rd}$ Generation Partnership project; Technical Specification Group Services and System Aspects; Policy and Charging Control Architecture

(56) References Cited

OTHER PUBLICATIONS (Release 9)," 3GPP TS 23.203 V9.2.0, vol. 23, 203, No. V9.2.0; Sep. 1, 2009, 120 pages URL:ftp://ftp.3.gpp.org/specs/archive/23_series/23.203/.
Ericsson, Tdoc S2-000888; "SGSN decomposition," Document for discussion; R000 Architecture; 3GPP TSG SA2 Meeting #13; Berlin, May 22-26, 2000, 13 pages; http://www.3gpp.org/ftp/tsg_sa/WG2_Arch/TSGS2_13/tdocs/S2-000888.zip.
U.S. Appl. No. 14/633,572, filed Feb. 27, 2015, entitled "System and Method for Exchanging Information in a Mobile Wireless Network Environment," Inventors: Gary B. Mahaffey, et al.
U.S. Appl. No. 14/611,510, filed Feb. 2, 2015, entitled "Select Packet Sequence Acceleration in a Network Environment," Inventor(s): Bhagatram Janarthanan et al.
3GPP TS 23.261 v.10.1.0 Technical Specification—3GPP Organizational Partners, 3rd Generation Partnership Project; Technical Specification Group Services and System Aspects; IP flow mobility and seamless Wireless Local Area Network (WLAN) offload; Stage 2 (Release 10); © 2010, 22 pages; http://www.3gpp.org.
3GPP TR 23.829 v.10.0—3GPP Organizational Partners, 3rd Generation Partnership Project; Technical Specification Group Services and System Aspects; Local IP Access and Selected IP Traffic Offload (LIPA-SIPTO) (Release 10); 3GPP TR 23.829 V10.0.0 (Mar. 2011) © 2011, 43 pages: http://www.3gpp.org.
"Stroke Mobile Data Offload Solution Brief," © 2009 Stoke, Inc.; Aug. 2009, 4 pages; [Retrieved and printed Nov. 14, 2013] stoke.com/GetFile.asp?I=a08fed265abc4643edf6763307c1078.
3GPP TR 25.820 v8.0.0 (Mar. 2008), 3rd Generation Partnershp Project; Technical Specification Group Radio Access Networks; 3G Home NodeB Study Item Technical Report (Release 8); http://www.3gpp.org, 2008, 37 pages.
3GPP TR 29.814 v7.1.0 (Jun. 2007), 3rd Generation Partnership Project; Technical Specification Group Core Networks and Terminals Feasibility Study on Bandwidth Savings at Nb interface with IP transport (Release 7), Global System for Mobile Communications, http://www.3gpp.org, 2007, 19 pages.
3GPP TS 22.011 v8.4.1 (Jun. 2008), 3rd Generation Partnership Project; Technical Specification Group Services and System Aspects; Service accessibility (Release 8), Global System for Mobile Communications, http://www/3gpp.org, 2008, 25 pages.
3GPP TS 23.060 v8.1.0 (Jun. 2008), 3rd Generation Partnership Project; Technical Specification Group Services and System Aspects; General Packet Radio Services (GPRS); Service description; Stage 2 (Release 8), Global System for Mobile Communications, http://www.3gpp.org, 2008. 259 pages.
3GPP TS 23.107 v7.1.0 (Sep. 2007), 3rd Generation Partnership Project; Technical Specification Group Services and System Aspects; Quality of Service (QoS) concept and architecture (Release 7), http://www.3gpp.org, 2007, 40 pages.
3GPP TS 23.228 v8.5.0 (Jun. 2008), 3rd Generation Partership Project; Technical Specification Group Services and System Aspects: IP Multimedia Subsystem (IMS): Stage 2 (Release 8), http://www.3gpp.org, 2008, 240 pages.
3GPP TS 23.234 v7.7.0 (Jun. 2008), 3rd Generation Partnership Project; Technical Specification Group Services and System Aspects; 3GPP system to Wireless Local Area Network (WLAN) interworking; System description (Release 7), http://www.3gpp.org, 2008, 85 pages.
3GPP TS 23.236 v7.0.0 (Dec. 2006), 3rd Generation Partnership Project; Technical Specification Group Services and System Aspects: Intra-domain connection of Radio Access Network (RAN) nodes to multiple Core Network (CN) nodes (Release 7); Global System for Mobile Communications. http://www.3gpp.org, 2006. 37 pages.
3GPP TS 25.411 v7.1.0 (Sep. 2007); 3rd Generation Partnership Project; Technical Specification Group Radio Access Network: UTRAN iu interface layer 1 (Release 7), http://www.3gpp.org, 2007. 9 pages.
3GPP TS 25.413 V7.8.0 (Dec. 2007), 3rd Generation Partnership Project; Technical Specification Group Radio Access Network; UTRAN iu Interface RANAP signaling (Release 7), http://www.3gpp.org, 2007. 359 pages.
3GPP TS 25.415 v7.3.0 (Dec. 2006), 3rd Generation Partnership Project; Technical Specification Group Radio Access Network; UTRAN Iu interface user plane protocols (Release 7), http://www.3gpp.org, 2006, 64 pages.
3GPP TS 29.163 v8.3.0 (May 2008), 3rd Generation Partnership Project; Technical Specification Group Core Network and Terminals; Interworking between the IP Multimedia (IM) Core Network (CN) subsystem and Circuit Switched (CS) networks (Release 8), Global System for Mobile Communications, http://www.3gpp.org, 2008. 237 pages.
3GPP TS 29.234 v7.9.0 (Jun. 2008), 3rd Generation Partnership Project; Technical Specification Group Core Network and Terminals; 3GPP system to Wireless Local Area Network (WLAN) interworking: Stage 3 (Release 7); http://www.3gpp.org, 2008. 92 pages.
3GPP TS 29.332 v8.2.0 (Jun. 2008), 3rd Generation Partnership Project; Technical Specification Group Core Network and Terminals; Media Gateway Control Function (MGCF)—IM Media Gateway: Mn Interface (Release 8), http://www.3gpp.org, 2008. 73 pages.
3GPP TS 29.414 v8.1.0 (May 2008), 3rd Generation Partnership Project; Technical Specification Group Core Network and Terminals; Core networb Nb data transport and transport siganlling (Release 8), Global System for Mobile Communications, http://www.3gpp.org, 2008. 29 pages.
3GPP TS 29.415 v8.0.0 (May 2008), 3rd Generation Partnership Project; Technical Specification Group Core Network and Terminals; Core Network Nb Interface User Plane Protocols (Release 8), Global System for Mobile Communications, http://www.3gpp.org, 2008. 14 pages.
PRC Apr. 3, 2014 SIPO First Office Action from Chinese Application No. 201080051408.1.
PRC Dec. 12, 2014 SIPO Second Office Action from Chinese Application No. 201080051408.1.
PRC Jun. 25, 2015 SIPO Third Office Action from Chinese Application No. 201080051408.1.

* cited by examiner

SYSTEM AND METHOD FOR MANAGING OUT OF ORDER PACKETS IN A NETWORK ENVIRONMENT

RELATED APPLICATIONS

This Application is a continuation (and claims the benefit of priority under 35 U.S.C. §120) of U.S. application Ser. No. 12/642,790, filed Dec. 19, 2009, entitled "SYSTEM AND METHOD FOR MANAGING OUT OF ORDER PACKETS IN A NETWORK ENVIRONMENT," Inventor(s) Walter Dixon et al., now U.S. Pat. No. 8,792,495 B1. The disclosure of the prior application is considered part of (and is incorporated by reference in) the disclosure of this application.

TECHNICAL FIELD

This disclosure relates in general to the field of communications and, more particularly, to managing out of order packets in a network environment.

BACKGROUND

Networking architectures have grown increasingly complex in communication environments. As the subscriber base of end users increases and/or becomes mobile, proper routing and efficient management of communication sessions and data flows becomes critical. Typically, subscribers seek to access content from various locations in the network. Certain subscribers may seek to access content in which the subsequent ordering of packets is inconsequential. In some instances, unnecessarily queuing packets can reduce throughput and, more generally, inhibit performance. The ability to properly manage out of order packets and to accurately bill for data presents a significant challenge to component manufacturers, network operators, and system administrators.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

A method is provided in one example embodiment and includes creating at a network element an entry designating an out of order ("OOO") sequence number range associated with a flow and receiving at the network element a packet associated with the flow, wherein the packet corresponds to a first sequence number range, wherein the first sequence number range falls within the OOO sequence number range designated in the entry. The method may further include updating the entry to remove sequence numbers comprising the first sequence number range from the OOO sequence number range and forwarding the packet without awaiting receipt of any other packets associated with the flow.

Example Embodiments

Figure 1:
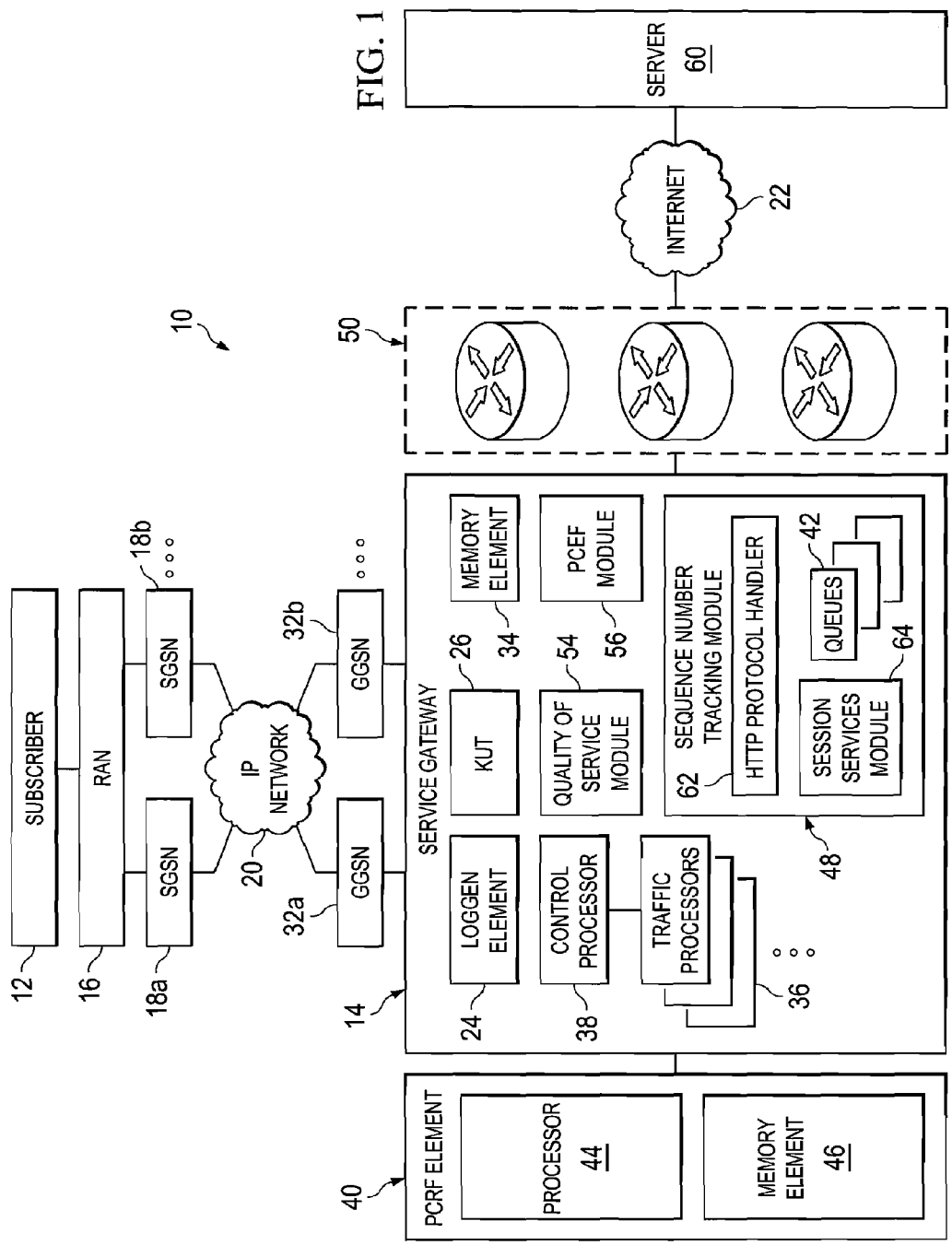
FIG. 1 is a simplified block diagram of a communication system for managing out of order packets in a network environment in accordance with one embodiment of the present disclosure.

Turning to FIG. 1, FIG. 1 is a simplified block diagram of a communication system 10 for managing out of order packets in a network environment. FIG. 1 may include a subscriber 12, a service gateway 14, a radio access network (RAN) 16, multiple serving general packet radio service (GPRS) support nodes (SGSNs) 18a and 18b, and an Internet protocol (IP) network 20. Additionally, communication system 10 may include multiple gateway GPRS support nodes (GGSNs) 32a and 32b. In addition, service gateway 14 may include a loggen element 24, a known user table (KUT) 26, and multiple traffic processors 36, which have a logical connection to a control processor 38.

Service gateway 14 may additionally include a sequence number tracking module 48 (that can include a number of queues 42), a hypertext transfer protocol (HTTP) protocol handler 62, and a session services module 64. Service gateway 14 may also include a quality of service (QoS) module 54, a policy control enforcement function (PCEF) module 56, and a memory element 34. Communication system 10 may also include a policy and charging rules function (PCRF) element 40, which includes a processor 44, and a memory element 46. Additionally, communication system 10 includes a server 60, which may provide content or services sought by subscriber 12. Additionally, communication system 10 may include multiple inline service nodes (ISNs) 50, which have a logical connection to an Internet 22. In this particular instance, each ISN 50 is part of respective network paths directed toward server 60. Server 60 can be a web server responsible for traffic destined for various hostnames (e.g., having various uniform resource locators (URLs)) such as Google.com, Yahoo.com, ESPN.com, etc.

Communication system 10 may include a configuration capable of transmission control protocol/internet protocol (TCP/IP) communications for the transmission and/or reception of packets in a network. Communication system 10 may also operate in conjunction with a user datagram protocol/IP (UDP/IP) or any other suitable protocol where appropriate and based on particular needs. Communication system 10 may be generally configured or arranged to represent a 2G, a 2.5G, or a 3G communication architecture applicable to a Global System for Mobile (GSM) environment in accordance with a particular embodiment of the present disclosure. Communication system 10 may also be configured to operate with any version of any suitable GPRS tunneling protocol.

For purposes of illustrating certain example techniques of communication system 10, it is important to understand the communications that may be traversing the network. The following foundational information may be viewed as a basis from which the present disclosure may be properly explained. Packets are typically parsed in order, as they are received by a given network device. In some instances, a request may involve a large HTTP data stream (e.g., a video stream or a JPEG), where parsing is not necessarily required over the length of that aggregate data. Typically, network devices will parse a portion of the HTTP traffic. In many scenarios, HTTP requests and response headers are parsed, but the payloads are not parsed. For example, the payload of a response, whose headers indicate that it is not a multipart or chunked response, (and that also includes a valid Content-Length field) is often not parsed. A large amount of unparsed HTTP data (e.g., binary data, Joint Photographic Experts Group (JPEG or JPG) files, etc.) can cross a given network device.

Communication system 10 can resolve these coordination issues (and others) by configuring service gateway 14 to properly manage out of order packets, while maintaining accurate byte counts and while accurately billing for information propagating through service gateway 14. Service gateway 14 can execute HTTP out of order packet processing to allow HTTP unparsed packets to be processed out of order. Service gateway 14 enables out of order forwarding of a parsed protocol. This feature can occur during segments in which packets being out of order are not problematic. In addition, it should be noted that service gateway 14 has the intelligence to move in and out of its queuing state activities. Stated otherwise, for segments in which sequence number ordering is important, service gateway 14 can understand that this particular request needs to be treated differently.

In one generic example, service gateway 14 can be configured to indicate that certain portions (e.g., Point A through Point B) of a given stream are unparsed and, therefore, packets can be received out of order (OOO). Once Point B in this example is reached, then a more ordered set of packets can be received. Within this portion of unordered packets, service gateway 14 has the intelligence to account for packets (e.g., for billing, for charging, etc.) passing through it. This can include accounting for the exact number of TCP bytes passing through service gateway 14, as well as properly accounting for the packets that are received.

As a practical matter, it should also be noted that there are resource limitations with any type of network appliance. Stated in different terms, packets can consume space, where a given device can only queue so many packets before packets become susceptible to being dropped. When a packet is queued, a far end network device does not receive its expected acknowledgment (ACK message). In many cases, when the ACK message is not timely received, the far end network device can begin to reduce its respective window size. This could lead to a flow control mechanism causing the throughput to drop for this particular session (e.g., a presumption is made that some type of network congestion exists). Service gateway 14 can accommodate this issue (and others) by allowing packets to flow through it even though the packets may be received out of order. This would alleviate the potential for throttling that would otherwise occur due to perceived congestion. Note that in the instance where packets are indeed dropped due to some type of overflow in the queues, then actual congestion occurs and throttling would be initiated, which would be problematic for the reasons outlined above. Service gateway 14 can resolve these issues and increase throughput, even though it may be incurring some additional processing in its operations.

Thus, service gateway 14 can improve throughput for individual streams by eliminating certain queuing techniques for specific types of flows. Such a protocol could be particularly applicable to layer-7 (L7) routing and/or dispatching. Service gateway 14 can have other applicability to TCP selective acknowledgment (SACK) instances, or in cases involving large windows. In a general sense, processing the unparsed portions of HTTP traffic without enforcing packet ordering can improve performance for the TCP flow and, therefore, prevent the throttling of HTTP flows. Some of these possible packet flows are discussed below and, further, are illustrated in an example set of configurations depicted in FIGS. 2-14. Before turning to some of the operations of these arrangements, a brief discussion is provided about some of the possible infrastructure of FIG. 1.

Subscriber 12 can be associated with clients, customers, or end users wishing to initiate a communication in communication system 10 via some network. The term 'subscriber' is inclusive of devices used to initiate a communication, such as a computer, a personal digital assistant (PDA), a laptop or electronic notebook, a cellular telephone, an iPhone, an IP phone, or any other device, component, element, or object capable of initiating voice, audio, video, media, or data exchanges within communication system 10. Subscriber 12 may also be inclusive of a suitable interface to the human user, such as a microphone, a display, or a keyboard or other terminal equipment. Subscriber 12 may also be any device that seeks to initiate a communication on behalf of another entity or element, such as a program, a database, or any other component, device, element, or object capable of initiating an exchange within communication system 10. Data, as used herein in this document, refers to any type of numeric, voice, video, media, or script data, or any type of source or object code, or any other suitable information in any appropriate format that may be communicated from one point to another.

Service gateway 14 and PCRF element 40 are network elements that facilitate service flows between endpoints and a given network (e.g., for networks such as those illustrated in FIG. 1). As used herein in this Specification, the term 'network element' is meant to encompass routers, switches, gateways, bridges, loadbalancers, firewalls, inline service nodes, proxies, servers, processors, modules, or any other suitable device, component, element, or object operable to exchange information in a network environment. This network element may include sequence number tracking module 48 to support the activities related to out of order packet management for particular flows, as outlined herein. Moreover, the network element may include any suitable hardware, software, components, modules, interfaces, or objects that facilitate the operations thereof. This may be inclusive of appropriate algorithms and communication protocols that allow for the effective exchange of data or information.

In one implementation, service gateway 14 includes software to achieve (or to foster) the out of order packet management operations, as outlined herein in this Specification. Note that in one example, this network element can have an internal structure (e.g., a processor, a memory element, etc.) to facilitate some of the operations described herein. In other embodiments, these packet management features may be provided externally to these elements or included in some other network element to achieve this intended functionality. Alternatively, service gateway 14 may include this software (or reciprocating software) that can coordinate with other network elements in order to achieve the operations, as outlined herein. In still other embodiments, one or several devices may include any suitable algorithms, hardware, software, components, modules, interfaces, or objects that facilitate the operations thereof.

In a Gx-enabled network, service gateway 14 can act as a PCEF, either as part of an enhanced GGSN (eGGSN) node, where service gateway 14 and a GGSN are provided as separate cards in a given network element. Alternatively, service gateway 14 can be configured to operate as a standalone Gi-node, with interoperability from external GGSNs. In eGGSN mode, service gateway 14 can act as a Gx interface endpoint, while the GGSN manages packet data protocol (PDP) contexts. Service gateway 14 and a given GGSN can communicate with each other using a remote authentication dial in user service (RADIUS) protocol, or any other suitable protocol where appropriate. Other protocols to be used in such communications can include Diameter, service gateway interface (SGI), terminal access controller access-control system (TACACS), TACACS+, etc.

Service gateway 14 can offer basic Gx support with enhancements for per-user layer 7 rules, dynamic policy loading, and per-user service policies. In a Gi-node mode, a standalone service gateway 14 can act as a Gx interface endpoint. The Gi-node mode can support the same functions as the eGGSN mode. To enable Gx support for a particular subscriber, service gateway 14 can define a user profile and associate that profile with the subscriber. For example, the user profile can enable Gx for associated subscribers. The user profile can also define the actions that service gateway 14 can take if a PCRF fails. In addition, the user profile can define the mobile policy control and charging (MPCC) profile to be used by service gateway 14 when sending per-user credit control requests (CCRs) to PCRF element 40.

Service gateway 14 can determine that a user is a Gx user in several ways. For example, a given GGSN can send a RADIUS accounting start request or a RADIUS accounting interim request: both of which can indicate that the user is a Gx user. Alternatively, service gateway 14 can compare the access point name (APN) name in an attribute (e.g., a Called-Station-Id attribute) of the RADIUS accounting start against a configured list of APN names to determine that the user is a Gx user. In regards to a dynamic loading of policies, service gateway 14 can dynamically load global contents, maps, policies, billing plans, and services from PCRF element 40. If configured to do so, service gateway 14 can dynamically load policies as it boots up (i.e., preloading of policies). Service gateway 14 also supports exporting the IP and TCP headers from a subscriber TCP SYN (or SYN-ACK) packet to PCRF element 40 via the Gx protocol.

RAN 16 is a communication interface between subscriber 12 and SGSNs 18a and 18b. RAN 16 may comprise a base transceiver station and a base station controller in one embodiment. The communication interface provided by RAN 16 may allow data to be exchanged between subscriber 12 and any number of selected elements within communication system 10. RAN 16 may facilitate the delivery of a request packet generated by subscriber 12 and the reception of information sought by subscriber 12. RAN 16 is only one example of a communication interface between subscriber 12 and SGSNs 18a and 18b. Other suitable types of communication interfaces may be used for any appropriate network design and these may be based on specific communication architectures.

SGSNs 18a, 18b, and GGSNs 32a, 32b are communication nodes or elements that cooperate in order to facilitate a communication session involving subscriber 12. GGSNs 32a-b are communication nodes operating in a GPRS environment that may be working in conjunction with multiple SGSNs 18a and 18b to provide a communication medium in a GPRS service network. GGSNs 32a and 32b can provide a GPRS tunneling protocol (GTP), any PDP authentication, authorization, and accounting (AAA) operations, and QoS RAN signaling. GPRS may support multiple internet communication protocols and may enable existing IP, point-to-point protocol (PPP), or any other suitable applications or platforms to operate over a given network.

IP network 20 represents a series of points or nodes of interconnected communication paths for receiving and transmitting packets of information that propagate through communication system 10. IP network 20 offers a communicative interface between subscriber 12 and selected GGSNs 32a-b, and may be any local area network (LAN), wireless local area network (WLAN), metropolitan area network (MAN), Intranet, Extranet, wide area network (WAN), virtual private network (VPN), or any other appropriate architecture or system that facilitates communications in a network environment. IP network 20 may implement a UDP/IP connection and use a TCP/IP communication language protocol in particular embodiments of the present disclosure. However, IP network 20 may alternatively implement any other suitable communication protocol for transmitting and receiving data packets within communication system 10. Internet 22 offers a communicative interface between server 60 and ISNs 50. Internet 22 may foster any communications involving services, content, video, voice, or data more generally, as it is exchanged between subscriber 12 and various network elements.

PCRF element 40 can be configured to act as a Diameter server and perform the following functions: 1) use the Gx interface to provision PCC rules to (and remove PCC rules from) PCEF module 56; 2) manage policy control decisions; 3) provide network control regarding the service data flow detection, QoS, and flow-based charging towards PCEF module 56; 4) receive session and media-related information from application functions (AFs); and 5) inform the AFs of traffic plane events.

PCEF module 56 can act as a Diameter client and perform the following functions: 1) use the Gx interface to send traffic plane events to PCRF element 40; 2) enforce policy, handle flow-based charging, control QoS and the handling of user plane traffic; 3) provide service data flow detection, counting for online and offline charging interactions; and 4) report changes in the status of service data flows. In a Gx-enabled network, the PCC rules can be used to: 1) detect a packet that belongs to a service data flow; 2) identify the service to which the service data flow contributes; and 3) provide applicable charging parameters and policy control for a service data flow. PCC rules can be dynamically provisioned by PCRF element 40 to PCEF module 56 over the Gx interface. Dynamic PCC rules can be dynamically generated in PCRF element 40. Dynamic PCC rules can be activated, modified, and deactivated at any time.

Loggen element 24 is a storage element operable to build billing records and communicate the billing records to a billing system based on information provided by KUT 26. Loggen element 24 may also operate to store data for later use and execute all formatting for billing records to be communicated to a billing system. Loggen element 24 may be implemented using hardware, software, or any other suitable element or object operable to store information and to generate a billing record to be communicated to a billing system. Loggen element 24 may generate logging records or billing records and additionally send messages to a billing system element associated with a change in SGSN.

KUT 26 is a data storage element that manages one or more correlations between the ID of subscriber 12 and a corresponding IP address. KUT 26 could be simply part of any memory element within service gateway 14. KUT 26 may also store information relating to billing, previously designated for subscriber 12, and the billing system may be invoked when additional information associated with subscriber 12 is communicated to service gateway 14. KUT 26 may be consulted as additional billing records are created in order to determine that a billing system should receive selected billing records. KUT 26 may also include an application program interface (API) that may be implemented in order to obtain user ID information for an IP address from a data flow.

KUT 26 is provided with the capability of mapping the source IP address (or any other subscriber 12 parameter) to a user ID. The user ID may be obtained from an external database, where appropriate, or any other suitable location. Alternatively, the user ID may be extracted from a RADIUS flow, a TACACS communication flow, a Diameter communication flow, or any other suitable communication protocol flow, communication session, or data exchange. The database may be populated at any suitable time and updated using any suitable mechanism, such as via the sniffing of RADIUS or TACACS flows.

In one example implementation, HTTP protocol handler 62 and session services module 64 cooperate in order to achieve an effective management of out of order packets being received by service gateway 14. For example, software within HTTP protocol handler 62 can parse incoming headers and determine the out of order range for the particular flow. Determining the out of order range can more generally include interpreting the protocol. Comparing incoming packets to the out of order range (e.g., along with executing decisions about when to forward or when to queue certain packets) can be performed by session services module 64. One or more application program interfaces (APIs) may be used in order to foster, or otherwise facilitate, any of these described operations. In addition, both HTTP protocol handler 62 and session services module 64 can be configured within (or be capable of interfacing with) one or more traffic processors 36, which can manage individual sessions. For example, an individual session exists for each TCP flow on an individual traffic processor 36.

In operation, session services module 64 can operate in the following manner. The OOO TCP counting implementation can be configured to react to OOO packets by recording the missing sequence numbers in an OOO missing queue (e.g., within queues 42). In addition, the session sequence number position can be moved to the end of the out of order packet sequence number, as though it had started with the expected sequence number. Since the protocols that use this implementation do not parse the content, problems are not encountered as the late packets arrive.

HTTP protocol handler 62 is configured to provide session services module 64 with a range of sequence numbers where OOO processing is allowed. In one example implementation, an application program interface (API) can be used such that an OOO missing queue entry will be created for the OOO allowed range. The session current sequence number can be set to the sequence number after the OOO allowed range. As packets arrive for the OOO allowed range, service gateway 14 can count the TCP bytes and remove those sequence numbers from the OOO missing queue such that packets within that range may arrive in any order.

A packet that arrives with a sequence number beyond the current expected sequence number can be handled as an OOO packet. The packet can be queued in the OOO queue and held until the TCP stream position effectively catches up to it. A packet that contains the current expected sequence number, either at the beginning or somewhere else within the packet, can be parsed starting with the byte at the next expected sequence number.

In one example implementation, OOO packets received by a session operating in this mode would not create new missing OOO queue entries. OOO missing queue entries can be created by HTTP protocol handler 62. As an additional optimization, fragmented packets are not reassembled if all of the TCP payload bytes are within the OOO allowed range. In one example implementation, an API can be provided to allow parsed sessions that undergo an L4 downgrade to forgo all further OOO queuing in a specific direction. The session can be flagged for OOO processing in that direction, and packets in the OOO queue can be handed to HTTP protocol handler 62.

In one particular implementation, HTTP protocol handler 62 can consider the following situations as eligible for OOO forwarding: 1) a request or response that has a content length header and that additionally is not a multipart/chunked response; 2) a request or response that HTTP parsing code is marked FIN terminated (no parsing until end of session); and 3) a request or response that HTTP parsing code has downgraded to L4.

In the first identified scenario, HTTP can request session services to perform OOO forwarding until the end of the request/response in question. Parser state can be updated to indicate that the "End of Message Body" has been encountered and the subsequent packets belonging to that specific request/response can be treated as retransmits. In scenarios 2) and 3) identified above, session services can be asked to disable OOO queuing completely. For HA instances, on the standby, the request and response are already marked for downgrade when setting up the session. Adding a call to session services to disable OOO queuing for both request and response directions is sufficient to handle this scenario.

Inline service nodes (ISNs) 50 represent different types of network elements (e.g., routers, switches, gateways, etc.) that can offer various services and capabilities for subscriber 12. Thus, particular ISNs can offer different services for incoming flows. For example, one ISN may be associated with video compression such that any flow associated with this particular technology or protocol would be routed to that ISN. Another ISN may be tasked with content filtering operations, while still another ISN may be associated with voice data associated with a VPN connection. Thus, in changing the path for a particular communication flow, the packets can be processed or implicated differently depending on which ISN is processing the particular flow. In one example, there is a default route associated with particular web servers, and this particular default could be the shortest path between two network points. In another example, particular routing decisions are executed such that particular flows are directed to specific paths that can accommodate specific subscriber needs. In one example, ISNs 50 may not be simple routers in a more traditional sense. ISNs 50 can be more complex service nodes operating on network flows at much higher levels, rather than providing simple routing and forwarding operations. For example, these nodes may implement specialized inline services such as image and video optimization, wireless TCP optimizations, protocol transformations (WAP/HTTP), content filtering controls, etc.

Quality of service module 54 is configured to execute quality of service decisions for particular subscribers. This may include referencing or accessing a given profile for particular subscribers. Additionally, quality of service module 54 can interface with PCEF module 56 in order to render or to execute quality of service decisions. Quality of service module 54 can also interface with sequence number tracking module 48 in order to properly manage and track the forwarding and/or billing activities for particular packets.

Turning to additional details associated with particular QoS activities of communication system 10, QoS actions (e.g., to be performed by quality of service module 54) can be specified by configuring a QoS profile for each particular subscriber. Such a profile can be stored within service gateway 14, provided in a table external to service gateway 14, provided in a database, or otherwise suitably stored, maintained, cached, or referenced in order to execute quality of service decisions. The profile can be attached to a billing plan (per-user) and/or a service (per-user service). The QoS profile configuration can describe the various parameters for policing and marking traffic. Traffic actions can include taking no action, marking Differentiated Services Code Point (DSCP) bits, dropping the traffic, etc. Note that service gateway 14 can be employed on a per-user basis, or on a per-user service. The per-user basis implies that the QoS is applied to traffic to/from a particular subscriber. The per-user service implies that the QoS can be applied to traffic to/from a particular subscriber and that also matches a specific service. Stated differently, the QoS can be applied to each service instance in certain examples.

Server 60 can be a web server offering content or services to any subscriber or any group of subscribers. For example, server 60 could be any network element associated with www.ESPN.com or www.yahoo.com: both of which could offer content for their end users. Alternatively, server 60 can be any destination, location, or node that is sought to be accessed or used by subscriber 12. Server 60 may provide the requested service/content, or provide a portal, pathway, or gateway to another location that includes the desired data. In other embodiments, server 60 could simply be a data storage location or a processor that can store or deliver content or services to one or more subscribers 12.

Figure 2:
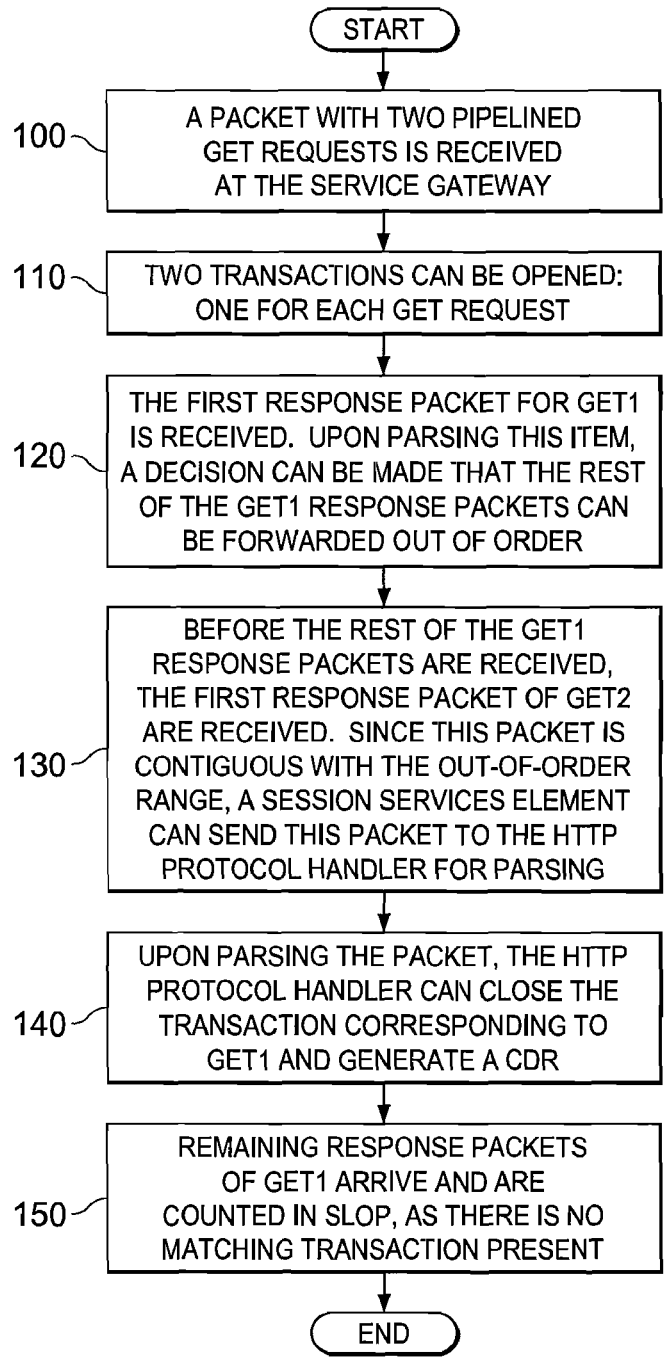
FIG. 2 is a simplified flow diagram illustrating potential operations associated with the communication system.

Turning to FIG. 2, FIG. 2 illustrates an example flow associated with HTTP pipelined requests. One behavior of HTTP protocol handler 62 is to close out a transaction when the first response packet for the next transaction is received. This leads to potentially more slop bytes when pipelining is prevalent. Note that slop activities are specific to a particular implementation only and, therefore, are not applicable to all configurations outlined herein. Note also that communication system 10 includes counting TCP bytes correctly, while dynamically switching between parsed (order-enforced) and unparsed (order-agnostic) modes. Transactions and slop can be associated with specific implementation artifacts of service gateway 14 in which the counted bytes are then divvied up and charged. Thus, communication system 10 has relevance independent of how the counted bytes are charged.

FIG. 2 considers this particular slop issue in the following sequence. At step 100, a packet with two pipelined GET requests is received at service gateway 14. The requests are labeled as GET1 and GET2 in the following discussion. At step 110, two transactions are opened: one for each GET request. At step 120, the first response packet for GET1 is received. Upon parsing this, HTTP can decide that the rest of the GET1 response packets can be forwarded out of order, where it informs session services module 64 accordingly.

At step 130, before the rest of GET1 response packets are received, the first response packet of GET2 is received. Since this packet is contiguous with the out-of-order range, session services module 64 can send this packet to HTTP protocol handler 62 for parsing. At step 140, upon parsing the packet, HTTP protocol handler 62 can close the transaction corresponding to GET1 and generate a call detail record (CDR). At step 150, the remaining response packets of GET1 arrive and are counted within some slop segment, as there is no matching transaction present.

A potential solution to this issue above is to delay closing the transaction if there are missing packets. Such missing packets can be detected by checking the session services sequence number queue for any elements in the sequence number range of interest. An alternative would be to compare the HTTP TCP byte count for the transaction against the sequence number range for that same transaction. If the count were less than the sequence number range, that would indicate missing packets.

FIGS. 3-8 illustrate how certain HTTP flows can be managed when out of order packets are received by service gateway 14. FIGS. 3-8 depict an emphasis on queuing out of order packets before allowing the packets to be forwarded to their intended destination. In contrast, FIGS. 9-14 illustrate how service gateway 14 can take a different approach to resolving out of order packets, where queuing is minimized and forwarding occurs more systematically.

Figure 3:
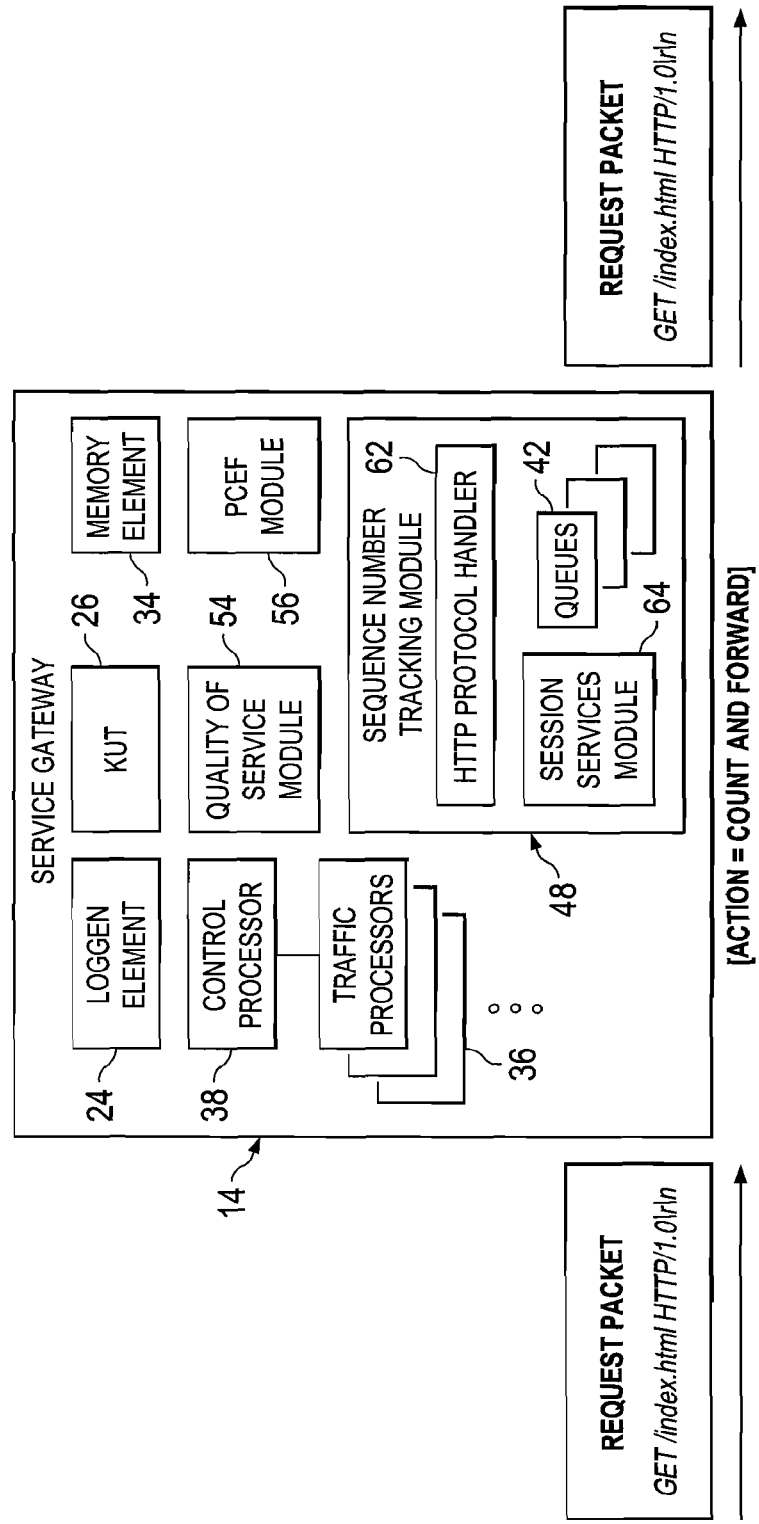
FIGS. 3-14 are simplified block diagrams illustrating packets associated with example flows propagating in the communication system.
Figure 4:
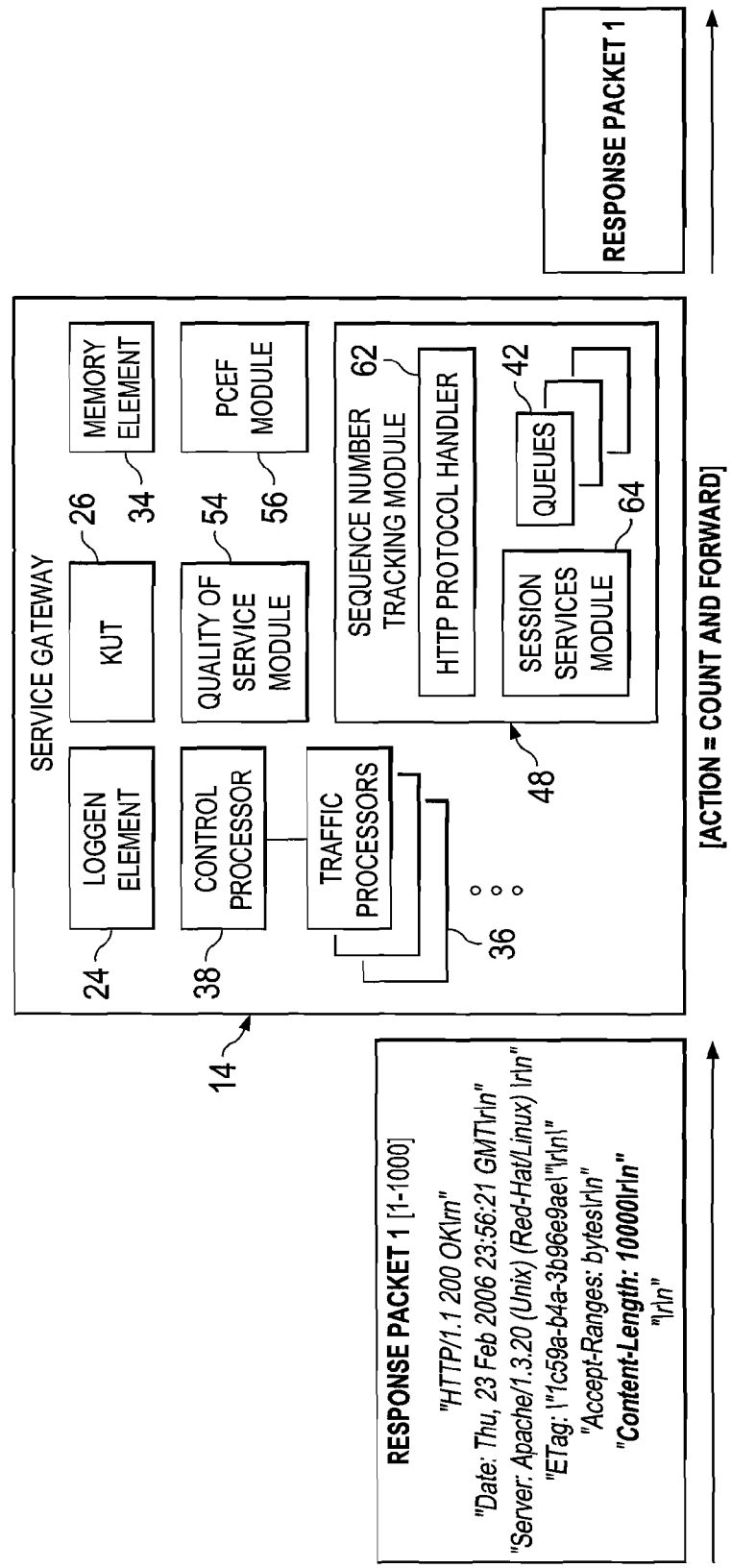
Figure 5:
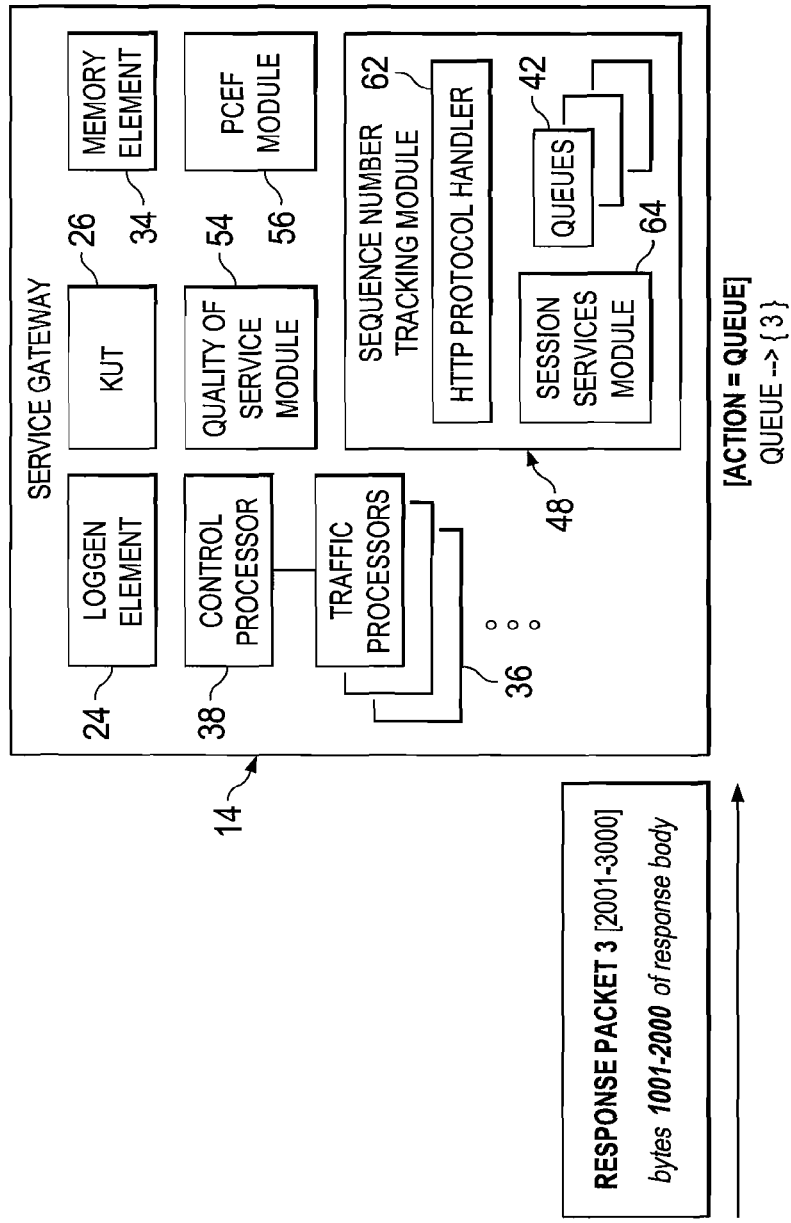

Turning to the first set of example illustrations, FIG. 3 illustrates an HTTP request being received by service gateway 14. The HTTP request is forwarded to a given server, which can provide content being sought by a particular subscriber. FIG. 4 illustrates a response packet being received by service gateway 14 from the server. Again, the response packet is forwarded by service gateway 14 back toward the subscriber in this particular example, although it should be noted that service gateway 14 is bidirectional, as it can accommodate flows emanating from various directions. FIG. 5 illustrates a response packet #3 (having a sequence number range 2001-3000) being received by service gateway 14. In actuality, service gateway 14 was anticipating the reception of response packet #2 before response packet #3 arrived. In this instance, service gateway 14 queues response packet #3 (e.g., within queue #3). In theory, packet #3 is maintained until the missing packet #2 is received, in which case both packets are forwarded to their intended destination.

Figure 6:
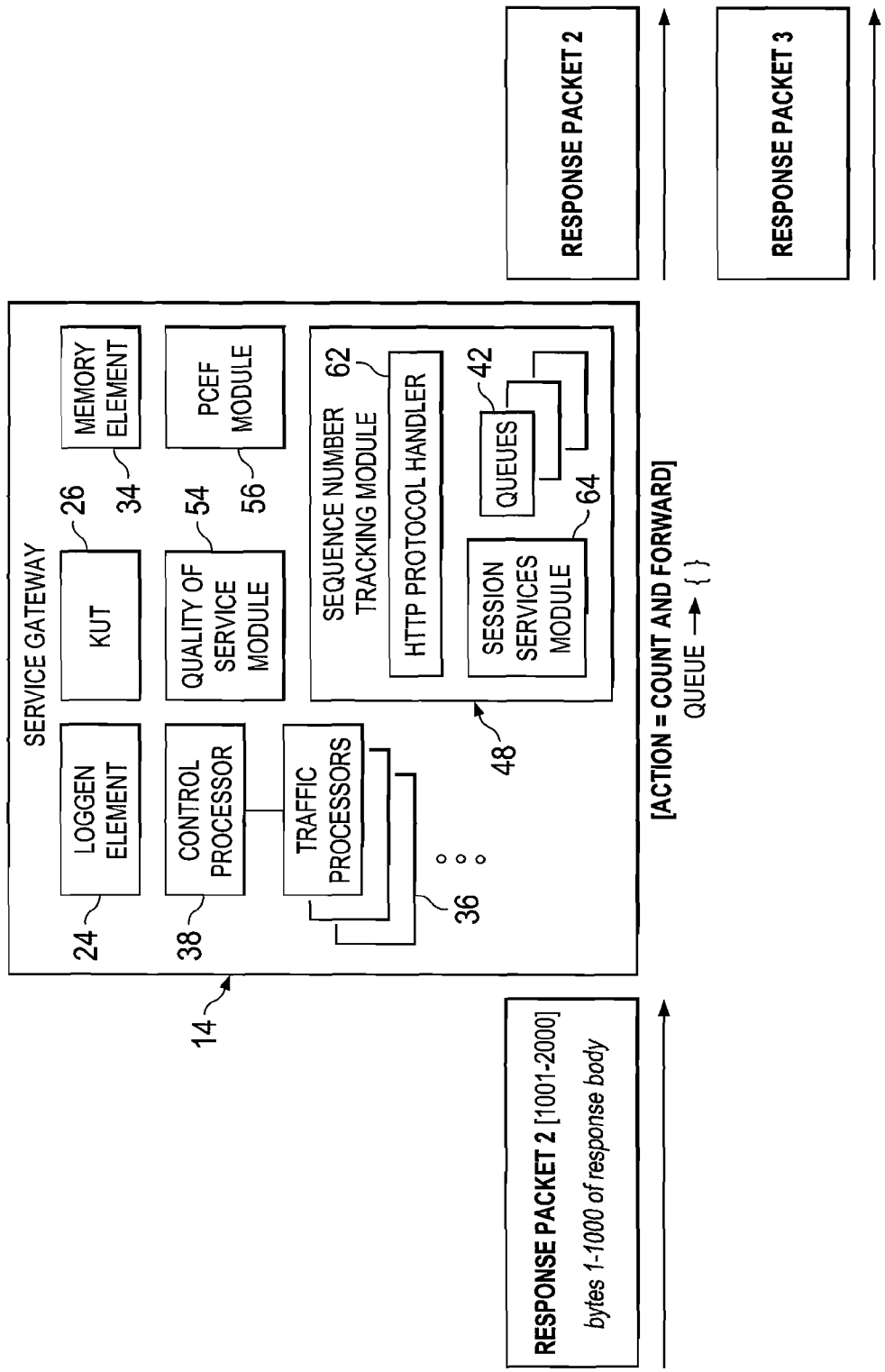
Figure 7:
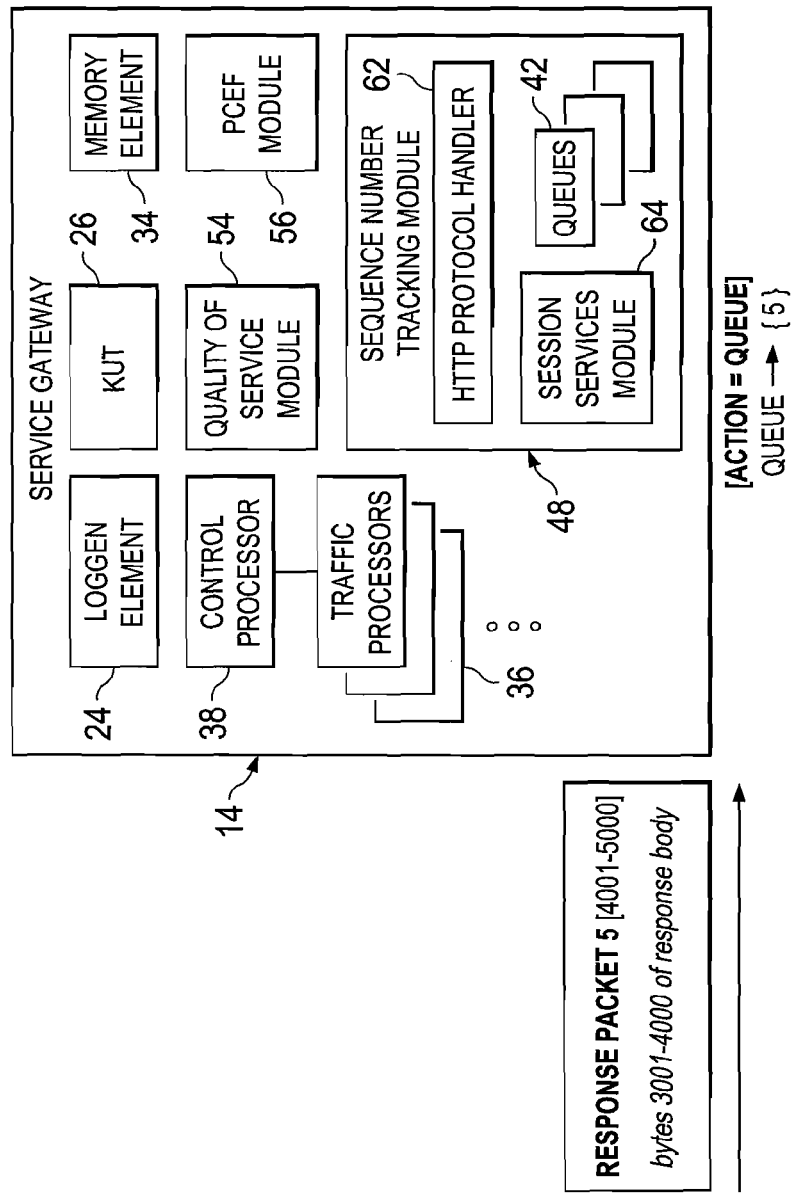
Figure 8:
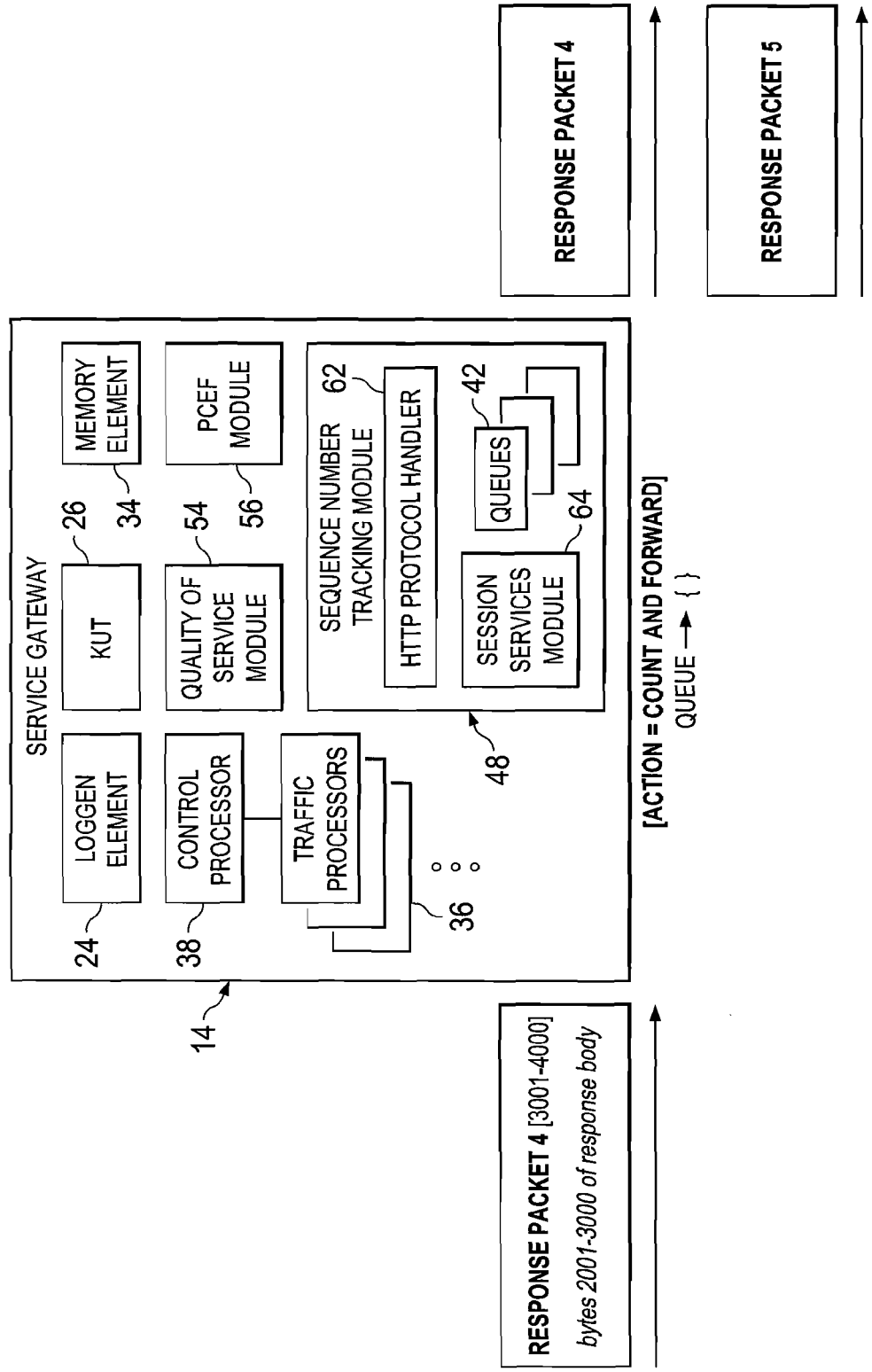

FIG. 6 illustrates service gateway 14 receiving the missing response packet #2, which has a sequence number range of 1001-2000. Response packet #2 is forwarded by service gateway 14, which subsequently forwards the previously queued response packet #3. FIG. 7 illustrates service gateway 14 receiving response packet #5 instead of the anticipated response packet #4. Response packet #5 has a sequence number range of 4001-5000 and it is properly queued (e.g., queue #5) for subsequent transmission. FIG. 8 illustrates response packet #4 being received by service gateway 14, which again forwards this packet, along with response packet #5 toward its proper destination.

Figure 9:
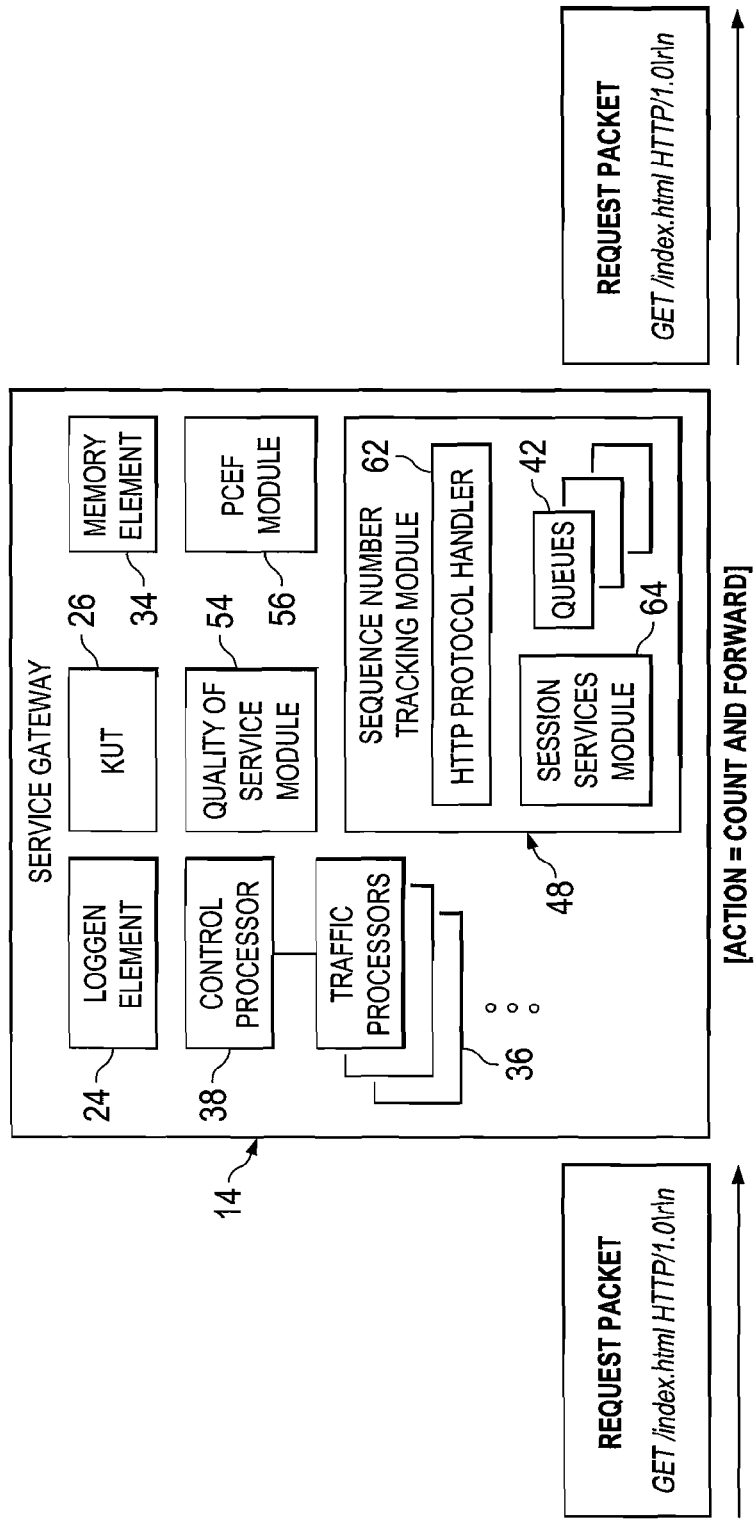
Figure 10:
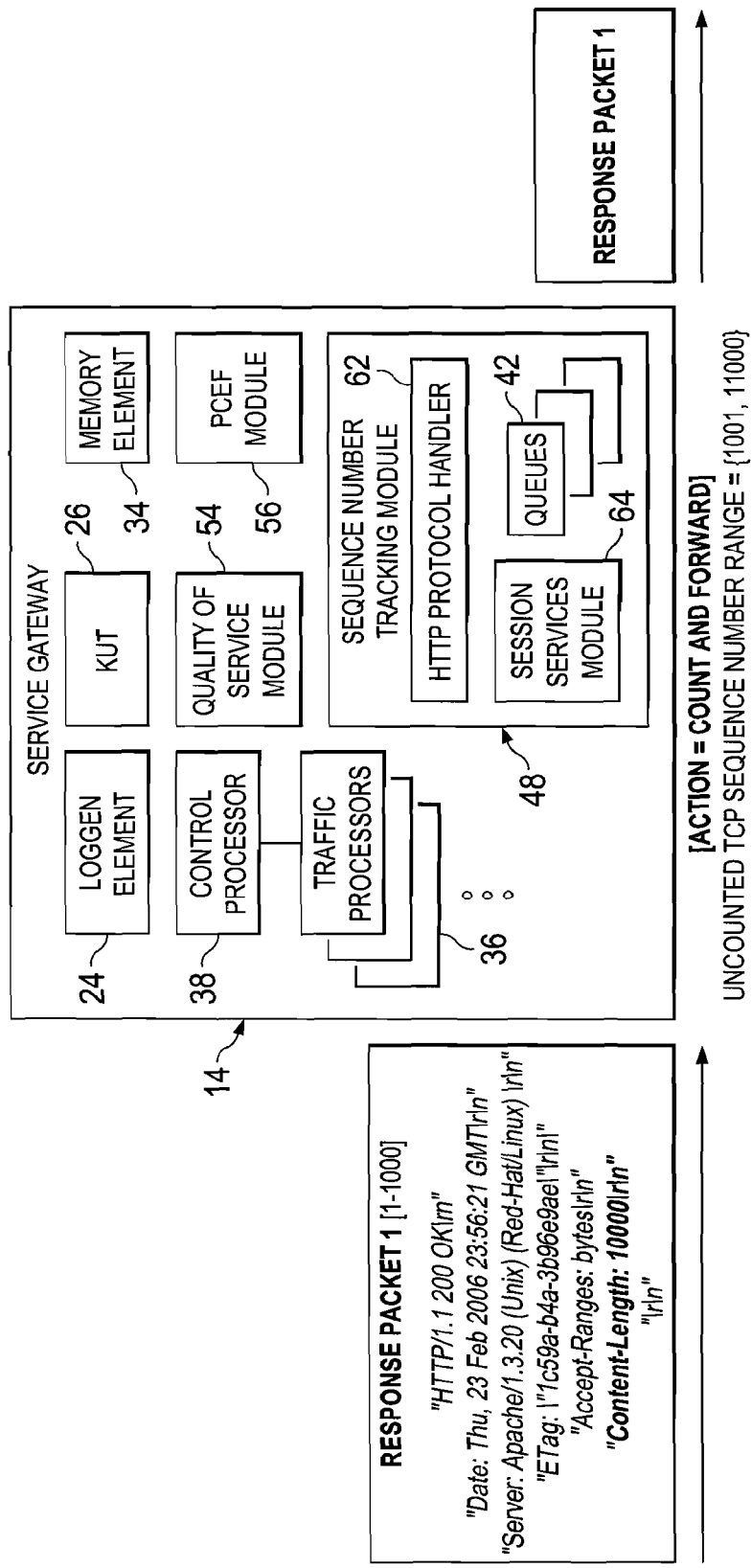

FIGS. 9-14 illustrate an alternative manner in which out of order packets can be properly handled. FIG. 9 depicts a request packet being received by service gateway 14, which properly forwards the request packet to its intended destination. FIG. 10 illustrates a response packet #1 being received by service gateway 14, which establishes an out of order sequence number range of 1001-11,000 (e.g., for the response body). Note that response packet #1 includes a content length element field designating 10,000 bytes as the out of order range to be used for this particular HTTP flow. Service gateway 14 can effectively maintain an internal state for this particular range. The range can be updated (i.e., adjusted) with beginning and ending sequence numbers. Response packet #1 is subsequently forwarded to its intended destination.

Note also that the sequence number order range (designated as 1001-11,000 in this particular example) represents an individual entry within a queue. Each individual element (or node) within the queue corresponds to a range of sequence numbers, which can be handled in any suitable order. In essence, any data arriving at service gateway 14 and which falls within this specified range can be handled out of order. There can be multiple entries within the queue and each entry could represent a certain sequence number range that is different from the other entries in the queue. Note that there could be sub-ranges within the designated range, as new packets arrive at service gateway 14 and other sequence number ranges are resolved, removed, or adjusted. Note that as used herein in this Specification, the term 'resolve' is meant to include any type of removal, adjustment, modification, deletion, clearing, marking, changing, or otherwise addressing a given entry that is maintained in the queue. The term 'queue' is meant to include any type of cache, memory, database, table, etc. in which sequence number entries can be appropriately maintained for subsequent reference.

Thus, as packets are received, portions within the sequence number range can be removed or otherwise resolved in the queue such that they are acknowledged as being received. The out of order range can continue to be adjusted as packets arrive at service gateway 14 such that ultimately, there is an empty queue for the out of order sequence number range (i.e., reflecting that all of the packets have been properly received and accounted for). In this sense, an accurate counting of these packets can be performed, where unnecessary queuing is avoided and the throughput is maximized.

Figure 11:
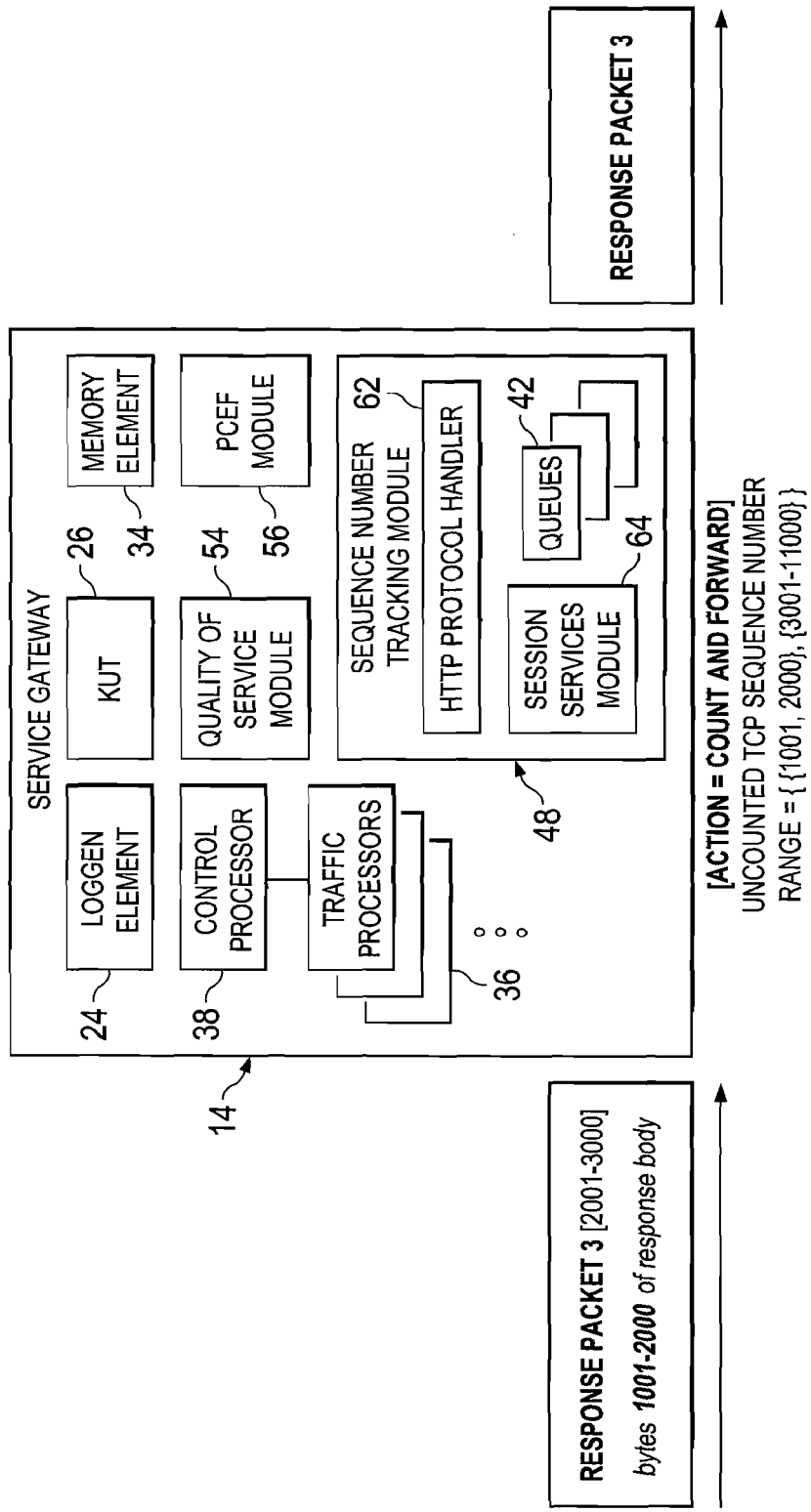

FIG. 11 illustrates service gateway 14 receiving response packet #3 having a sequence number range from 2001-3000. Note that response packet #3 is being received out of order for this particular HTTP flow. Service gateway 14 understands that this particular packet is within the designated range that was previously established in the out of order range queue. For this reason, it does not have to queue this packet and instead, and as illustrated, it forwards response packet #3 to its intended destination. Note that response packet #3 represents sequence numbers not yet seen by service gateway 14. For this reason, this packet is counted (e.g., TCP bytes are counted), as it is forwarded along to a next network location. In addition, when response packet #3 is forwarded, this particular sequence number range is effectively resolved (i.e., removed) in the out of sequence number range queue. In a general sense, this particular sequence number range is being marked as having already been seen by service gateway 14. If for whatever reason this particular response packet #3 is received at service gateway 14 (representing the same range of sequence numbers 2001-3000), then a simple lookup could be performed in the queue to search for this range. When that range is not found and there is no match found for this particular sequence number range, service gateway 14 understands that this represents a retransmission and, therefore, is not to be counted a second time.

Figure 12:
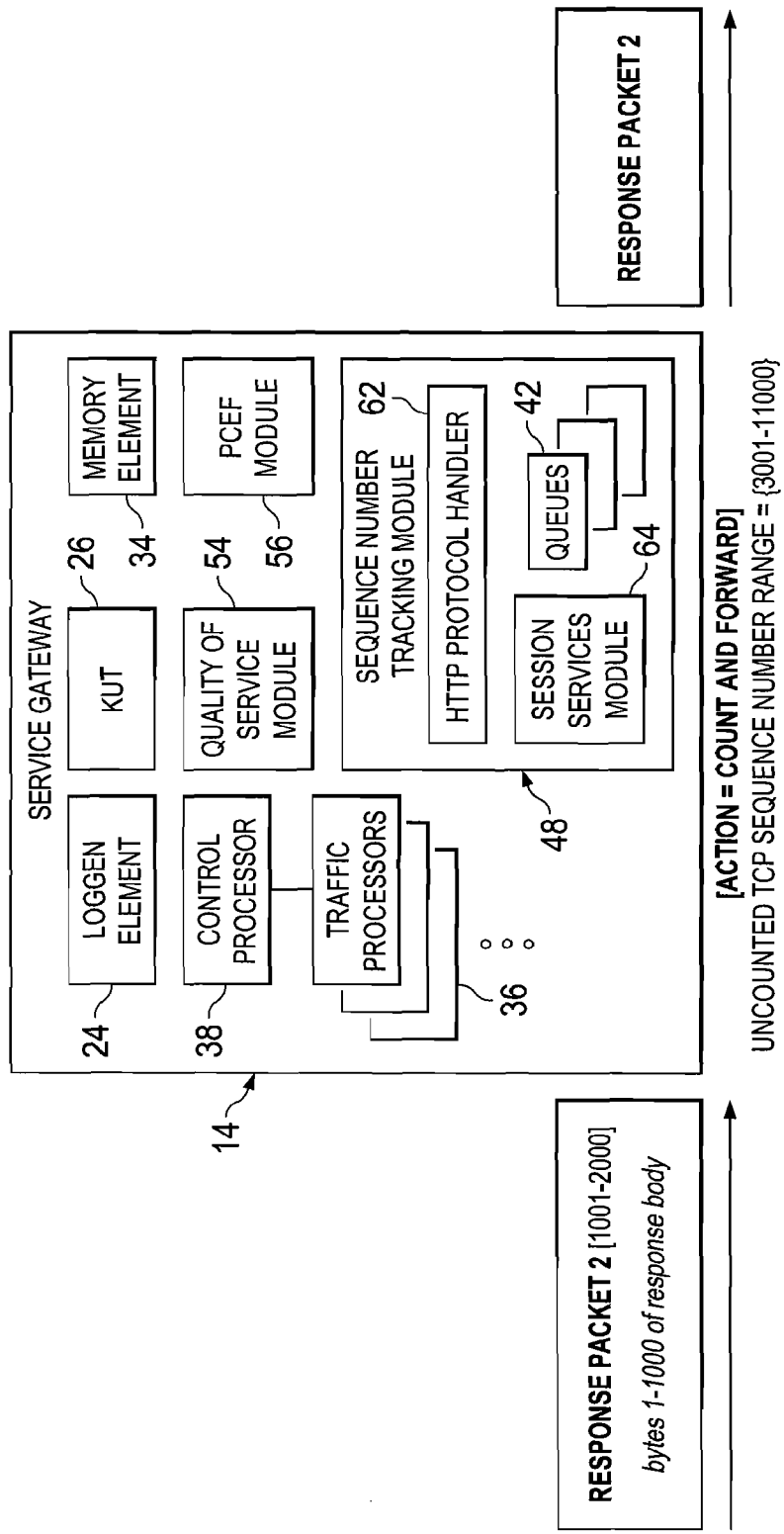

FIG. 12 illustrates response packet #2 (having a sequence number range of 1001-2000) being received by service gateway 14. Service gateway 14 understands that this range falls within the previously established range such that it can forward this packet along to its intended destination. More specifically, service gateway 14 can reference its out of order sequence number queue and eliminate a particular node (i.e., entry) associated with sequence numbers 1001-2000. The remaining sequence number range would effectively cover packets having sequence numbers not yet seen by service gateway 14 (i.e., from the originally allotted out of order sequence number range). In this particular example, and at this specific junction, service gateway 14 has seen sequence numbers 1-1000 (for response packet #1), 2001-3000 (for response packet #3), and 1001-2000 (for response packet #2). Thus, from the removal of these sequence numbers in the queue, the remaining sequence number range being maintained by service gateway 14 would be 3001-11,000. In this general sense, service gateway 14 continues to evaluate incoming packets such that ultimately this previously designated range of sequence numbers is effectively extinguished. Stated otherwise, service gateway 14 systematically evaluates sequence numbers (after being given a designated sequence number range) until the queue is empty, where all sequence numbers have been appropriately counted and acknowledged by service gateway 14.

Figure 13:
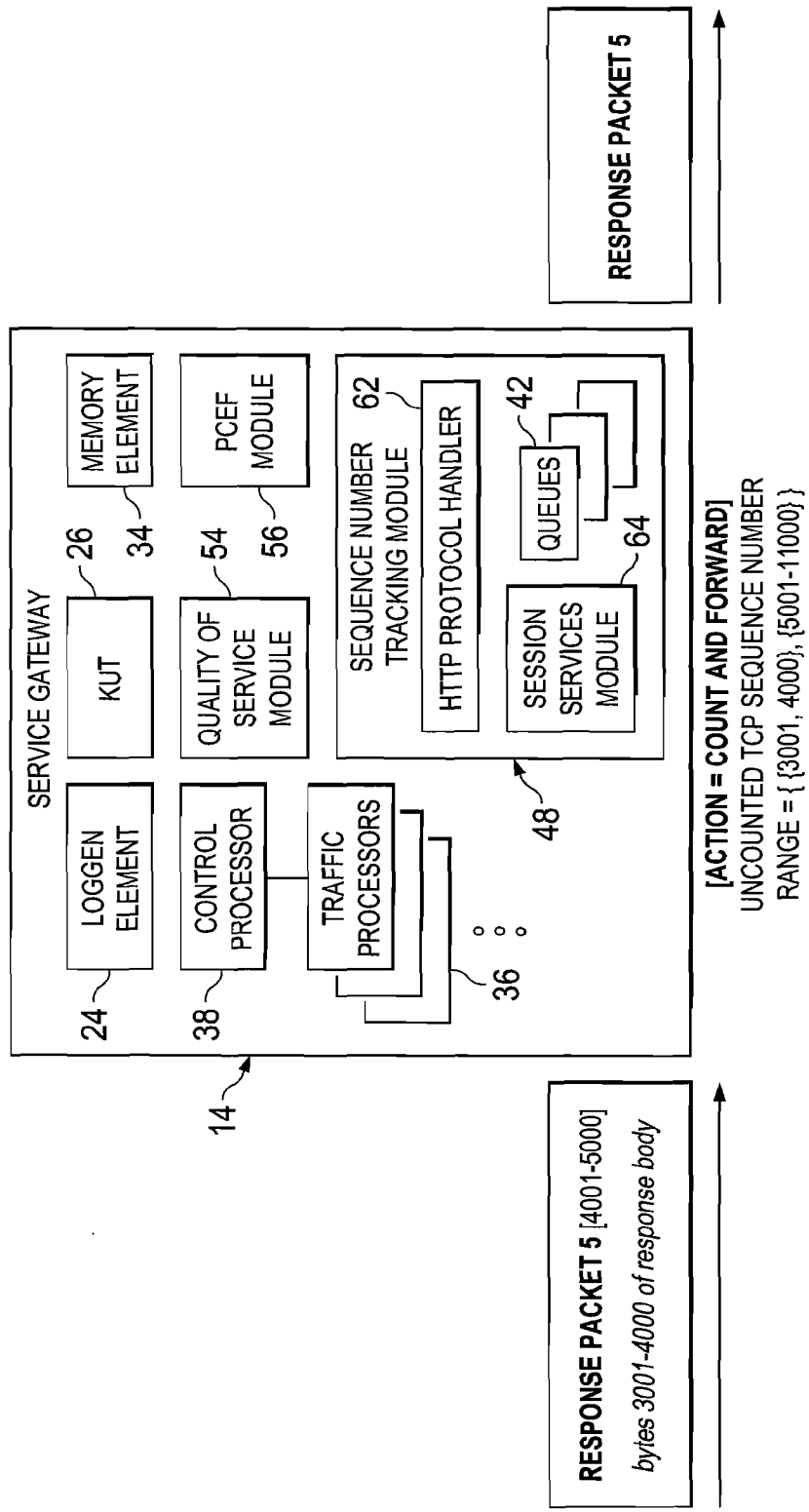
Figure 14:
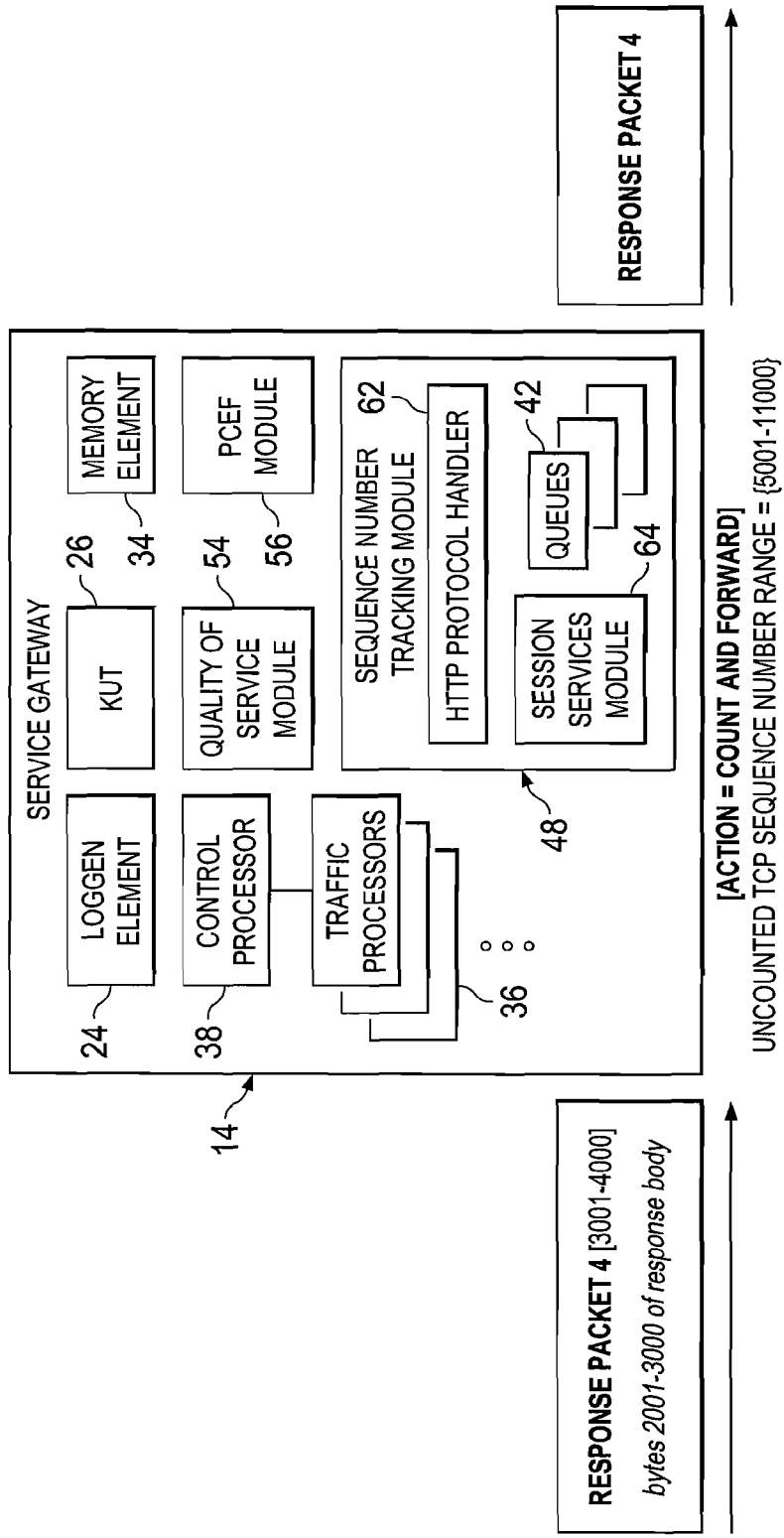

FIG. 13 illustrates service gateway 14 receiving response packet #5, which is out of order. Response packet #5 has a sequence number range of 4001-5000 and this falls within the previously designated sequence number range. Instead of queuing this particular packet, service gateway 14 forwards response packet #5 to its intended destination. FIG. 14 illustrates response packet #4 (having a sequence number range of 3001-4000) being received by service gateway 14, which would promptly forward this packet to its intended destination.

As demonstrated by the previous flow, service gateway 14 has the intelligence to simply forward along packets even though they are being received out of order. This is in contrast to forced queuing that would occur when packets are received out of order. The forced queuing would dictate that service gateway 14 would have to wait on previous packets (that would essentially fill the missing gaps of packets) before forwarding along the out of order packets. Instead, and as shown in FIGS. 9-14, service gateway 14 can quickly forward packets as they are received and, thereby, avoid unnecessarily queuing out of order packets. This can improve the overall throughput for service gateway 14. In addition, service gateway 14 has the intelligence to treat individual requests differently. For example, if a particular request is associated with a data flow where the sequence number order range is not important, then service gateway 14 can spring into action and perform the operations highlighted in FIGS. 9-14. Service gateway 14 can concurrently service other types of requests in which sequence numbering is important. For example, if service gateway 14 were to receive a contiguous sequence number range of 14,001-15,000 after receiving response packet #4 (of FIG. 14), then service gateway 14 would understand that this is associated with a new request. If the designated out of order sequence number range has not been established for this request, then service gateway 14 can quickly modify its behavior to accommodate a different technique for queuing packets (e.g., until they are properly ordered) before sending the packets along to their next intended destination.

Note that in certain example implementations, the out of order packet management functions outlined herein may be implemented by logic encoded in one or more tangible media (e.g., embedded logic provided in an application specific integrated circuit [ASIC], digital signal processor [DSP] instructions, software [potentially inclusive of object code and source code] to be executed by a processor, or other similar machine, etc.). In some of these instances, a memory element [as shown in FIG. 1] can store data used for the operations described herein. This includes the memory element being able to store software, logic, code, or processor instructions that are executed to carry out the activities described in this Specification. A processor can execute any type of instructions associated with the data to achieve the operations detailed herein in this Specification. In one example, the processor [as shown in FIG. 1] could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array [FPGA], an erasable programmable read only memory (EPROM), an electrically erasable programmable ROM (EEPROM)) or an ASIC that includes digital logic, software, code, electronic instructions, or any suitable combination thereof.

In one example implementation, service gateway 14 may include software in order to achieve the out of order packet management functions outlined herein. These activities can be facilitated by sequence number tracking module 48 (and/ or any of its associated internal components). Service gateway 14 can include memory elements for storing information to be used in achieving the intelligent out of order packet management, as outlined herein. Additionally, service gateway 14 may include a processor that can execute software or an algorithm to perform the out of order packet management, as discussed in this Specification. This device may further keep information in any suitable memory element [random access memory (RAM), ROM, EPROM, EEPROM, ASIC, etc.], software, hardware, or in any other suitable component, device, element, or object where appropriate and based on particular needs. Any of the memory items discussed herein (e.g., database, lookup table, cache, etc.) should be construed as being encompassed within the broad term 'memory element.' Similarly, any of the potential processing elements, modules, and machines described in this Specification should be construed as being encompassed within the broad term 'processor.' Each of the network elements can also include suitable interfaces for receiving, transmitting, and/or otherwise communicating data or information in a network environment.

Note that with the example provided above, as well as numerous other examples provided herein, interaction may be described in terms of two, three, or four network elements. However, this has been done for purposes of clarity and example only. In certain cases, it may be easier to describe one or more of the functionalities of a given set of flows by only referencing a limited number of network elements. It should be appreciated that communication system 10 (and its teachings) are readily scalable and can accommodate a large number of components, as well as more complicated/sophisticated arrangements and configurations. Accordingly, the examples provided should not limit the scope or inhibit the broad teachings of communication system 10 as potentially applied to a myriad of other architectures.

It is also important to note that the steps in the preceding flow diagrams illustrate only some of the possible signaling scenarios and patterns that may be executed by, or within, communication system 10. Some of these steps may be deleted or removed where appropriate, or these steps may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by communication system 10 in that any suitable arrangements, chronologies, configurations, and timing mechanisms may be provided without departing from the teachings of the present disclosure.

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain GGSN components, communication system 10 may be applicable to other protocols and arrangements such as any type of network access server (NAS), GPRS entry point, etc. Moreover, the present disclosure is equally applicable to various wireless technologies including Wi-Fi, WiMax, etc. In addition, other example environments that could use the features defined herein include Pico and femto architectures, where an appropriate out of order packet management would occur for one or more packets. Moreover, although communication system 10 has been illustrated with reference to particular elements and operations that facilitate the communication process, these elements and operations may be replaced by any suitable architecture or process that achieves the intended functionality of communication system 10.

What is claimed is:

1. A method, comprising:
   creating by a network element an entry comprising an out of order ("OOO") sequence number range associated with a flow, wherein the OOO sequence number range is indicated by a request packet received at the network element;
   receiving by the network element a packet associated with the flow, wherein the packet corresponds to a first sequence number range, wherein the first sequence number range falls within the OOO sequence number range designated in the entry;
   updating the entry to remove sequence numbers comprising the first sequence number range from the OOO sequence number range; and
   forwarding the packet without awaiting receipt of any other packets associated with the flow;
   wherein the updating and forwarding are performed by the network element.

2. The method of claim 1, further comprising receiving at the network element a request packet associated with the flow.

3. The method of claim 1, further comprising:
   receiving an additional packet associated with the flow, wherein the additional packet corresponds to a second sequence number range; and
   determining whether the OOO sequence number range designated in the entry includes sequence numbers comprising the second sequence number range.

4. The method of claim 3, further comprising:
   classifying the additional packet as a retransmission if the OOO sequence number range designated in the entry does not include sequence numbers comprising the second sequence number range.

5. The method of claim 3, further comprising forwarding the additional packet without awaiting receipt of any other packets associated with the flow if the OOO sequence number range designated in the entry includes sequence numbers comprising the second sequence number range.

6. The method of claim 5, further comprising updating the entry to remove sequence numbers comprising the second sequence number range from the OOO sequence number range.

7. The method of claim 1, wherein creating the entry includes creating a segment within a queue for the OOO sequence number range comprising expected sequence numbers for packets associated with the flow.

8. The method of claim 1, further comprising:
   accounting for a number of transmission control protocol ("TCP") bytes passing through the network element; and
   accounting for packets received at the network element.

9. The method of claim 1, further comprising billing a first set of packets associated with the flow in response to forwarding the first set of packets, wherein the request packet is associated with a data type in which out of order processing for packets within the flow is permissible.

10. One or more non-transitory tangible media that includes code for execution and when executed by a processor causes performance of operations comprising:
    creating by network element an entry comprising an out of order ("OOO") sequence number range associated with a flow, wherein the OOO sequence number range is indicated by a request packet received at the network element;

receiving at the network element a packet associated with the flow, wherein the packet corresponds to a first sequence number range, wherein the first sequence number range falls within the OOO sequence number range designated in the entry;

updating the entry to remove sequence numbers comprising the first sequence number range from the OOO sequence number range; and forwarding the packet without awaiting receipt of any other packets associated with the flow.

11. The non-transitory tangible media of claim 10, wherein the operations further comprise receiving at the network element a request packet associated with the flow.

12. The non-transitory tangible media of claim 10, wherein the operations further comprise:

receiving an additional packet associated with the flow, wherein the additional packet corresponds to a second sequence number range; and determining whether the OOO sequence number range designated in the entry includes sequence numbers comprising the second sequence number range.

13. The non-transitory tangible media of claim 12, wherein the operations further comprise:

classifying the additional packet as a retransmission if the OOO sequence number range designated in the entry does not include sequence numbers comprising the second sequence number range.

14. The non-transitory tangible media of claim 12, wherein the operations further comprise forwarding the additional packet without awaiting receipt of any other packets associated with the flow if the OOO sequence number range designated in the entry includes sequence numbers comprising the second sequence number range.

15. The non-transitory tangible media of claim 14, wherein the operations further comprise updating the entry to remove sequence numbers comprising the second sequence number range from the OOO sequence number range.

16. An apparatus, comprising:

a memory element configured to store data, a processor to execute instructions associated with the data, and a tracking module configured to:

create by a network element an entry comprising an out of order ("OOO") sequence number range associated with a flow, wherein the OOO sequence number range is indicated by a request packet received at the network element;

receive a packet associated with the flow, wherein the packet corresponds to a first sequence number range, wherein the first sequence number range falls within the OOO sequence number range designated in the entry;

update the entry to remove sequence numbers comprising the first sequence number range from the OOO sequence number range; and forward the packet without awaiting receipt of any other packets associated with the flow.

17. The apparatus of claim 16, wherein the tracking module is further configured to receive a request packet associated with the flow.

18. The apparatus of claim 16, wherein the tracking module is further configured to:

receive an additional packet associated with the flow, wherein the additional packet corresponds to a second sequence number range; and determine whether the OOO sequence number range designated in the entry includes sequence numbers comprising the second sequence number range.

19. The apparatus of claim 18, wherein the tracking module is further configured to:

classify the additional packet as a retransmission if the OOO sequence number range designated in the entry does not include sequence numbers comprising the second sequence number range.

20. The apparatus of claim 18, wherein the tracking module is further configured to:

forward the additional packet without awaiting receipt of any other packets associated with the flow if the OOO sequence number range designated in the entry includes sequence numbers comprising the second sequence number range; and update the entry to remove sequence numbers comprising the second sequence number range from the OOO sequence number range.

* * * * *